(12) United States Patent
Williams et al.

(10) Patent No.: US 7,805,038 B2
(45) Date of Patent: Sep. 28, 2010

(54) BIREFRINGENT PHOTONIC BANDGAP OPTICAL WAVEGUIDE

(75) Inventors: David Philip Williams, Bath (GB); Timothy Adam Birks, Bath (GB); Hendrik Sabert, London (GB)

(73) Assignee: NKT Photonics A/S, Birkerod (DK)

( * ) Notice: Subject to any disclaimer, the term of this patent is extended or adjusted under 35 U.S.C. 154(b) by 423 days.

(21) Appl. No.: 10/561,594

(22) PCT Filed: Jun. 21, 2004

(86) PCT No.: PCT/GB2004/002625

§ 371 (c)(1),
(2), (4) Date: Dec. 20, 2005

(87) PCT Pub. No.: WO2004/113979

PCT Pub. Date: Dec. 29, 2004

(65) Prior Publication Data

US 2006/0177187 A1    Aug. 10, 2006

(30) Foreign Application Priority Data

Jun. 20, 2003  (GB)  ................. 0314485.4

(51) Int. Cl.
*G02B 6/02*   (2006.01)

(52) U.S. Cl. ........................................ 385/123
(58) Field of Classification Search .................. 385/123
See application file for complete search history.

(56) References Cited

U.S. PATENT DOCUMENTS

| | | |
|---|---|---|
| 6,097,870 A | 8/2000 | Ranka et al. |
| 6,718,105 B2 * | 4/2004 | Hasegawa et al. ........... 385/123 |
| 6,954,574 B1 * | 10/2005 | Russell et al. ............... 385/125 |
| 7,106,933 B2 * | 9/2006 | Han ........................... 385/125 |

(Continued)

FOREIGN PATENT DOCUMENTS

WO    99/00685    1/1999

(Continued)

OTHER PUBLICATIONS

Saitoh K. et al., "Highly birefringent photonic bandgap fibers and its dispersion properties", Int. Topic Meeting on Microwave Photonics, Nov. 5, 2002, pp. 329-332.

(Continued)

*Primary Examiner*—Uyen-Chau N Le
*Assistant Examiner*—Hoang Tran
(74) *Attorney, Agent, or Firm*—Buchanan Ingersoll & Rooney, PC.

(57) ABSTRACT

A birefringent elongate waveguide for guiding light, comprises: a core region (110), comprising an elongate region of relatively low refractive index; and a cladding region (100), comprising elongate regions (105) of relatively low refractive index interspersed with elongate regions (117,120) of relatively high refractive index. In a transverse cross-section of the waveguide, a (5) relatively high refractive index boundary region (115) is provided that surrounds the core region and has either (1) at most two-fold rotational symmetry or (2) a rotational symmetry that reduces the rotational symmetry of the waveguide to at most two-fold rotational symmetry. The symmetry of the boundary region (115) results at least in part from azimuthal variations therein, which are substantially uncharacteristic of the cladding region (100).

37 Claims, 17 Drawing Sheets

U.S. PATENT DOCUMENTS

| | | | |
|---|---|---|---|
| 2001/0026667 A1* | 10/2001 | Kawanishi et al. | 385/125 |
| 2004/0151450 A1* | 8/2004 | Wadsworth et al. | 385/123 |
| 2004/0179796 A1* | 9/2004 | Jakobsen et al. | 385/123 |
| 2005/0276556 A1 | 12/2005 | Williams et al. | |

FOREIGN PATENT DOCUMENTS

| | | |
|---|---|---|
| WO | 00/49435 | 8/2000 |
| WO | 00/60388 | 10/2000 |
| WO | 00/60390 | 10/2000 |
| WO | 02/069051 A2 | 9/2002 |
| WO | 03/029854 A1 | 4/2003 |
| WO | 2004/083918 A1 | 9/2004 |
| WO | 2004/083919 A1 | 9/2004 |

OTHER PUBLICATIONS

Ortigosa-Blanch A. et al., "Highly Birefringent Photonic Crystal Fibers", Optics and Photonics, OSA, US, vol. 12, No. 12, Dec. 2001, p. 17.

Kumar VVrk et al., Optical Society of America/Institute of Electrical and Electronics Engineers: "Modified group-velocity dispersion in extruded photonic crystal fiber", vol Tops, vol. 86, Mar. 23, 2003, pp. 300-301.

Knight J C et al., "Photonic Band Gap Guidance in Optical Fibers", American Association for the Advancement of Science, US, vol. 282, No. 5393, Nov. 20, 1998, pp. 1476-1478.

Birks et al., "Full 2-D photonic bandgaps in silica/air structures", Electronics Letters, Oct. 26, 1995, vol. 31, No. 22, pp. 1941-1942.

J.D. Joannopoulos et al., "Chapter 2 of the book Photonic Crystals—Molding the Flow of Light", Princeton University Press, © 1995.

Litchinitser et al., Opt Lett, vol. 27 (2002), pp. 1592-1594.

Koshiba et al., "Polarisation-Dependent Confinement Losses in Actual Holey Fibres", IEEE Photonics Technology Letters, vol. 15, No. 5, May 2003, pp. 691-693.

Muller et al., "Measurement of photonic band-gap fiber transmission from 1.0 to 3.0 μm and impact of surface mode coupling", CLEO 2003.

International Search Report dated Aug. 3, 2004.

* cited by examiner

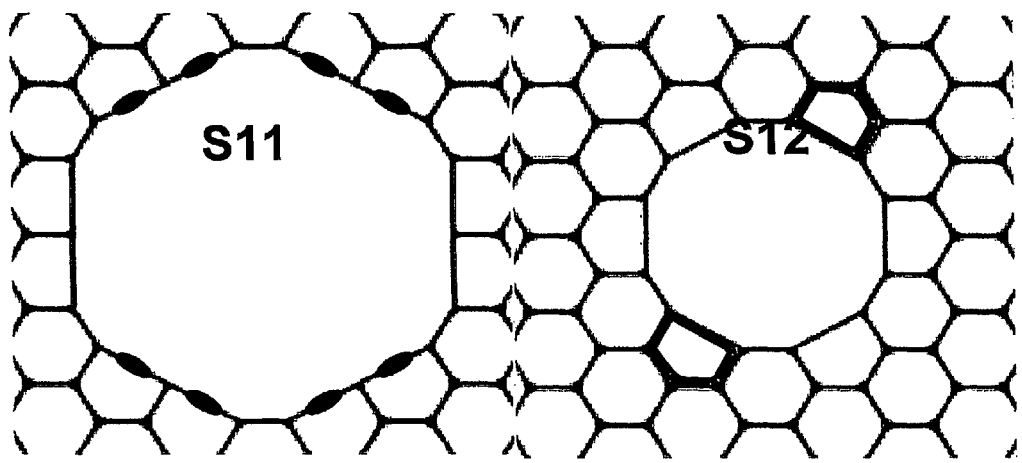
*Fig. 15*  *Fig. 16*
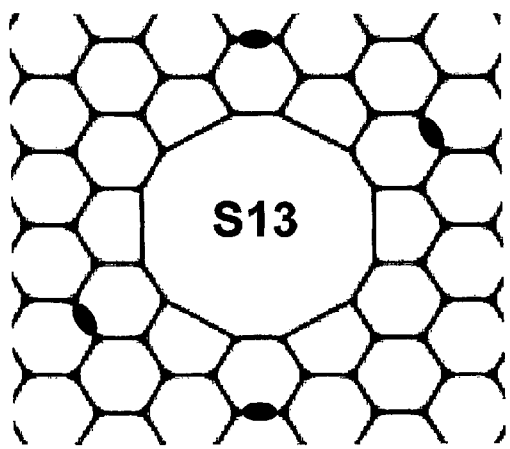  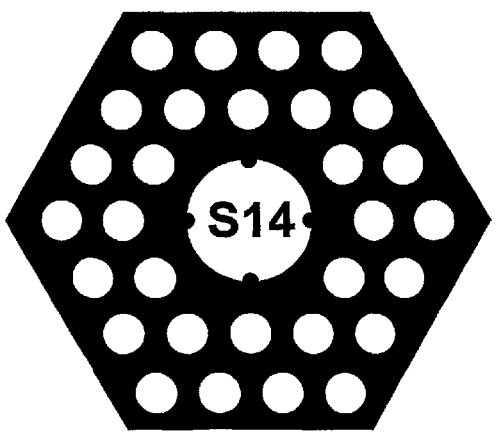
*Fig. 17*  *Fig. 18*

BIREFRINGENT PHOTONIC BANDGAP OPTICAL WAVEGUIDE

The present invention is in the field of photonic crystal fibres and methods for making photonic crystal fibres.

Birefringent optical fibres find application in situations where standard, single mode optical fibres do not offer adequate control over the polarisation of propagating light. A single-mode fibre is so called because it supports only one spatial mode at a frequency of interest, but that spatial mode exists in two polarisation states; that is, two degenerate modes that are polarised in orthogonal directions. In real fibres, imperfections will break the degeneracy of those modes and modal birefringence will occur; that is, the mode propagation constant β will be slightly different for each of the orthogonal modes. As the modal birefringence results from random imperfections, the propagation constants will vary randomly along the fibre. In general, light introduced into the fibre will propagate in both modes and will be coupled from one to the other by small bends and twists in the fibre. Hence, linearly polarised light will be scrambled into an arbitrary polarisation state as it propagates along the fibre. This leads to pulse broadening due to polarisation mode dispersion, which fundamentally limits the length a transmission fibre can be without signal conditioning.

In order to maintain the polarisation of a mode in a standard fibre, birefringence can be deliberately introduced into the fibre (so that the effective indices of the two polarisation modes are different) in order to render insignificant the effects of small imperfections. If light is linearly polarised in a direction parallel to one of the optical axes of a linear polarisation fibre then the light propagating along the fibre will maintain its polarisation even if the fibre is subjected to minor deformations. If it is linearly polarised at some other angle, the polarisation will change, as the light propagates down the fibre, independently of any deformations, from linear to elliptical to linear (not parallel to the starting polarisation) to elliptical and back to linear again, with a period expressed as the beat length, $L_B$, where $$L_B = \frac{2\pi}{|\beta_x - \beta_y|}$$

and $\beta_x$ and $\beta_y$ are the propagation constants of the orthogonal modes. This variation is a consequence of a phase difference between two orthogonal components of the mode, which results from the difference in their propagation constants. The shorter the beat length, the more resilient is the fibre to polarisation-scrambling effects, for example deformations due to twisting, localised pressure or bending. Typically, conventional polarisation-preserving fibre has a beat length on the order of several millimeters. The strength of birefringence can also be represented by the parameter $$B = \frac{|\beta_x - \beta_y|}{k_0} = |n_x - n_y|,$$

where $$k_0 = \frac{2\pi}{\lambda} \text{(where } \lambda \text{ is the vacuum wavelength)}$$

and $n_x$ and $n_y$ are the effective refractive indices of the orthogonal modes.

As used hereinafter, and unless otherwise indicated, 'rotational symmetry', n, of an optical fibre is the symmetry about a longitudinal axis of the fibre defined by n=360/N, where N is the angle through which the fibre must rotate about the selected axis for the structure after rotation to exectly overlay an image of the structure taken before its rotation. For example, if the fibre has a hexagonal cross-section, then N=60 degrees and the rotational symmetry n is six-fold. Fibre symmetry can conveniently be considered, and will typically be so considered herein, with reference to a transverse cross-section of a fibre structure. In practice, a birefringent optical fibre is a fibre that has no more than two-fold rotational symmetry (i.e. N≧180) about any longitudinal axis of the fibre, due to structural or stress-induced characteristics of the fibre. It will be apparent that birefringence can be produced in fibres that have less than two-fold rotational symmetry (i.e. N>180). As such, herein, for convenience, a fibre that has less than two-fold rotational symmetry about all longitudinal axes will be referred to as having either one-fold rotational symmetry (i.e. N=360) or, simply, no rotational symmetry.

It is known that photonic crystal fibres can be birefringent.

Photonic crystal fibres typically have a core region surrounded by a microstructured cladding region. The cladding region is microstructured in that is has regions of low refractive index interspersed with regions of high refractive index. The particular arrangement of low and high refractive index regions in the cladding provides the cladding with a so-called effective refractive index, the value of which depends on several factors, such as the wavelength of propagating light and the particular arrangement of low and high refractive index regions.

There are two main classes of photonic crystal fibre; those with a core region which has a high refractive index compared with the cladding and those with a core region which has a low refractive index compared with the cladding. The low refractive index regions, in the core region or the cladding, may be air holes, holes under vacuum or filled with gas other than air, a liquid or another low refractive index material (or combinations of any of the foregoing).

The core region of a photonic crystal fibre typically forms a so-called defect in the cladding structure, which may have, but need not have, a periodic structure.

It is highly unlikely in practice that a photonic crystal fibre comprises a 'perfect' structure, due to imperfections being introduced during its manufacture and/or perturbations being introduced into by virtue of the presence of a core defect. As used herein, therefore, any reference to "array", "periodic", "lattice", or the like, imports the likelihood of imperfection.

Light guidance in known photonic crystal fibres is typically by one of two guidance mechanisms, although there may be other mechanisms which act instead of or as well as these two mechanisms.

The first light guidance mechanism, which typically applies to photonic crystal fibres having a high refractive index core region compared with the cladding, is total internal reflection. Such fibres are analogous in many ways to standard optical fibres and find application as single mode fibres over a wide range of wavelengths and core diameters as demonstrated in WO99/00685 (Birks et al.), birefringent fibres as demonstrated in WO00/49436 (Russell et al.) and non-linear fibres as demonstrated in U.S. Pat. No. 6,097,870 (Ranka et al.).

The second light guidance mechanism, which typically applies to photonic crystal fibres having a low refractive index core region compared with the cladding, is a so-called photonic bandgap (PBG). Such fibres, incorporating an air core surrounded by a lattice of air holes, were first proposed in 1995.

In, for example, "Full 2-D photonic bandgaps in silica/air structures", Birks et al., Electronics Letters, 26 Oct. 1995, Vol. 31, No. 22, pp. 1941-1942, it was proposed that a PBG may be created in an optical fibre by providing a dielectric cladding structure, which has a refractive index that varies periodically between high and low index regions, and a core defect in the cladding structure in the form of a hollow core. In the proposed cladding structure, periodicity was provided by an array of air holes that extended through a silica glass matrix material to provide a PBG structure through which certain wavelengths of light could not pass. It was proposed that light coupled into the hollow core defect would be unable to escape into the cladding due to the PBG and, thus, the light would remain localised in the core defect.

It has been demonstrated, for example with reference to international patent application WO00/49436 (mentioned above), that photonic crystal fibres can be made to exhibit birefringence by virtue of having an at most two-fold rotationally-symmetric structure. The symmetry of the fibre can be due to the particular cladding arrangement, the shape of the core region, or both.

WO00/60390 (Broeng et al.) discloses a number of examples of photonic crystal fibre structures that are described therein as being birefringent. In general, the examples comprise a cladding matrix material in which is embedded an array of features. The arrays in the examples typically have a six-fold rotationally-symmetric characteristic based on the positions of similarly shaped and similarly oriented features; for example the features are arranged in a triangular or honeycomb lattice. However, the features themselves have a lesser rotational symmetry, for example being oval or square. This has the effect of reducing the rotational symmetry of the overall structure to at most that of the features, or lower. In each structure, a core region is defined by breaking the periodicity of the array either by omitting a feature or including an additional feature.

US2001/0026667 (Kawanishi et al.) also discloses a number of examples of photonic crystal fibre structures that are described therein as being birefringent. In a first example, a fibre structure comprises a six-fold rotationally-symmetric cladding, comprising a triangular array of round air-holes in a matrix material. The periodicity of the array is broken by inclusion of a two-fold rotationally-symmetric core region, being either rectangular or oval. In a second example, a round core region breaks the periodicity of an array of air holes arranged in a two-fold rotationally-symmetric arrangement of rows of air holes. In a further example, a round core region sits at the centre of four regions of air holes, which are spaced in equal-sized segments around the core region. The regions comprise one of two sizes of air hole and regions that are on opposite sides of the core region have the same size of air hole, rendering the overall structure two-fold rotationally-symmetric. Structures similar to this last example are also described in WO 03/029854 (Kawanishi et al.).

WO 02/069051 (Kelsey et al.) discloses a number of two-fold rotationally-symmetric photonic crystal fibre structures based on a cladding structure of air holes in a matrix material. The similarly-sized air holes are arranged in a number of concentric rings of differing radii about a central air core. In one example, the rings are dissected by two rows of smaller air holes that extend across the cladding structure with a plane running through the centre of the core region. In another example, the core region itself is oval-shaped at the centre of the concentric rings of cladding air holes. Both examples provide a two-fold rotationally-symmetric structure.

The present invention is primarily concerned with photonic crystal fibres that have a relatively low refractive index core region compared with the cladding. Such fibres can guide light by a PBG guidance mechanism.

According to a first aspect, the present invention provides an elongate waveguide for guiding light, comprising:

a core region, comprising an elongate region of relatively low refractive index; and a cladding region, comprising elongate regions of relatively low refractive index interspersed with elongate regions of relatively high refractive index, including, in a transverse cross-section of the waveguide, a relatively high refractive index boundary region that surrounds the core region and has either (1) at most two-fold rotational symmetry or (2) a rotational symmetry that reduces the rotational symmetry of the waveguide to at most two-fold rotational symmetry, the symmetry of the boundary region resulting at least in part from azimuthal variations therein, which are substantially uncharacteristic of the cladding region.

The present inventors have identified in their co-pending patent applications PCT/GB2004/001288 and PCT/GB2004/001251 that the form of a core boundary, between a core and a cladding of a PBG fibre, can have a significant impact on the guiding properties, in particular the confinement properties, of a PBG fibre. The present inventors have now demonstrated that the form of a core boundary can also have a significant impact on the birefringence of PBG fibres and the like.

In arriving at the present invention, the inventors have observed that birefringent photonic crystal fibre structures have, hitherto, in general, been formed with (1) an anisotropic core, in the sense that it has 2-fold or less rotational symmetry by virtue of its shape, which is introduced into a periodic cladding structure, (2) an anisotropic cladding structure surrounding a generally circular core region, or (3) both an isotropic core and an isotropic cladding.

Regarding known birefringent photonic crystal fibres, a core boundary has typically been a simple function of the selected cladding and core structure arrangements. For example, in US2001/0026667 described above, which has an oval core region surrounded by a periodic, triangular lattice of air holes, the core boundary has an oval inner surface and an outer surface characterised solely by the size, number and proximity to the core region of the cladding holes. In other words, the core boundary has the characteristics of the chosen cladding, which are entirely consistent with inclusion of the reduced symmetry core into this cladding.

In contrast, and in very general terms, the present invention is concerned with core boundaries which have characteristics that are not entirely a function of, or characterised by, the choice of core and/or cladding structure. The inventors have found that the present approach can introduce relatively strong birefringence, particularly into PBG photonic crystal fibres.

The boundary region may have at most two-fold rotational symmetry at least in part due to azimuthal variations in a property of the boundary region, for example, in its material, thickness, shape, refractive index or other material properties, such as surface roughness.

The boundary region may comprise a plurality of relatively high refractive index boundary veins joined end-to-end around the core region at boundary nodes, each boundary node being joined between two boundary veins and to at least one relatively high refractive index region of the cladding region.

Then, the boundary region may have at most two-fold rotational symmetry at least in part due to one or more boundary veins having different properties than other boundary veins. For example, one or more boundary veins may be made from a different material or have a different thickness, shape, length, refractive index or other material property, such as surface roughness or loss, than other boundary veins. Of course, the one or more boundary veins in a structure may exhibit several different properties, for example being both longer and thicker than would typically be the case.

In addition, or alternatively, the boundary region may have at most two-fold rotational symmetry at least in part due to one or more boundary nodes having different properties than other boundary nodes. For example, one or more boundary nodes may be made from a different material or have a different size, shape, refractive index or other material property, such as surface roughness or loss, than other boundary nodes. Of course, again, the one or more boundary nodes in a structure may exhibit one or more different properties, for example being both larger and having a different refractive index.

The boundary region may comprise an inner periphery and an outer periphery, which has a substantially different form than the inner periphery. Thus, the combination of the forms of the inner periphery and the outer periphery may result in the boundary region having at most two-fold rotational symmetry.

The boundary region may comprise a plurality of boundary cells around the core region. Then, the boundary region may have at most two-fold rotational symmetry at least in part due to differences in one or more of the characteristics of the boundary cells, such that the boundary cells together may not tile onto any arrangement of cells in the cladding region.

The cladding region may comprise an array of relatively low refractive index regions in a matrix of relatively high refractive index regions. The array, apart from the boundary region, may be substantially periodic.

In any case, the cladding region, apart from the boundary region, may have a highest rotational symmetry that is less than or equal to two. Alternatively, the cladding region, apart from the boundary region, may have a rotational symmetry that is greater than two. In other words, in some embodiments, both the cladding and the core boundary may exhibit two-fold or less rotational symmetry.

Indeed, the core region, apart from the boundary region, may have a highest rotational symmetry that is less than or equal to two. Or, the core region, apart from the boundary region, may have a rotational symmetry that is greater than two. For example, the core region may be oval-shaped, giving the core boundary an underlying two-fold rotational symmetry, in combination with additional properties of the core boundary, for example thickness variations, which render the overall structure even more strongly birefringent.

In a preferred embodiment, the core region includes a hole. The hole may be evacuated or filled with a material other than air but, most probably, will be filled with air. Alternatively, the core region may not include a hole. For example, the core region may contain a low refractive index solid material or even a liquid.

At least some of the relatively high refractive index regions may comprise fused glass, for example silica. Other glasses may be used, for example silicate glasses such as germanosilicate or phosphosilicate glasses, non-silicate glasses such as phosphide or sulphide glasses (for example, lanthanide sulphide) or materials other than glass, such as polymer materials.

At least some of the relatively low refractive index regions in the cladding region may comprise a hole.

In preferred embodiments of the present invention, the waveguide has a beat length, which is less than 10 mm at a given wavelength. More preferably, the beat length may be less than 5 mm, 2 mm or even less than 1 mm. The given wavelength may be in the region of 1550 nm, 1310 nm, 1060 nm or 800 nm. Of course, other wavelengths, for example significantly longer wavelengths, may be of interest, particularly if not using silica.

In use, the two polarization states of a spatial mode of the waveguide may exhibit significantly different field decays at given radial distances from the centre of the waveguide. The inventors have shown that a birefringent core boundary can be designed to perturb only slightly one polarisation state, so that its mode characteristics remain favourable (as considered in more detail below), yet perturb the other polarisation state more substantially. The most surprising result is that the decay rate into a PBG cladding of the more strongly perturbed polarisation state can be reduced significantly compared to the substantially unaffected one, even if the former state has a wavelength that lies closer to the middle of the respective PBG. Even if the changes to the field distribution of the more affected polarisation state do not sufficiently increase its loss due, for example, to increased interface roughness scattering, this mode can be made to be attenuated at an appropriate rate by a suitable choice of the number of periods of cladding incorporated into the structure; the number of periods being chosen to adequately confine the relatively unperturbed state but to allow some leakage of the more perturbed one.

The fraction by volume of relatively lower refractive index regions in the cladding may exceed 50%, 60%, 70%, 80%, 85% or even 90%. In general, when the waveguide is required to guide light by a PBG, the fraction of lower refractive index regions in the cladding is selected to provide the required PBG in a known manner.

According to a second aspect, the present invention provides an optical fibre comprising a waveguide as described above.

According to a third aspect, the present invention provides an optical transmission system incorporating an optical fibre as described above.

According to a fourth aspect, the present invention provides a method of forming a photonic crystal fibre including the steps:

forming a preform comprising an elongate, relatively low refractive index core region, and, surrounding the core region, an elongate cladding region, comprising elongate regions of relatively low refractive index interspersed with elongate regions of relatively high refractive index;

forming, at the interface between the core region and the cladding region, a boundary region, comprising one or more relatively high refractive index regions, which has at most two-fold rotational symmetry due to azimuthal variations, which are uncharacteristic of the cladding region; and drawing the pre-form into a fibre, which has no more than two-fold rotational symmetry about any longitudinal axis.

The method may include forming the pre-form from a plurality of elongate members, at least some of which are capillaries. Alternatively, the method may include forming the pre-form by extrusion.

According to a fifth aspect, the present invention provides a method of forming a birefringent photonic crystal fibre comprising the steps:

arranging a plurality of elongate members, at least some of which are capillaries, into a pre-form stack comprising an elongate cladding region enclosing an elongate core region, the members in the cladding region forming a characteristic pattern, apart from at least one member in a boundary region, at or near to the core region, which breaks the characteristic pattern and renders the boundary region, in the transverse cross-section, no more than two-fold rotationally symmetric about any axis; and drawing the pre-form stack into a fibre, which has no more than two-fold rotational symmetry about any longitudinal axis.

The present invention will now be described in more detail, by way of example only, with reference to the following drawings, of which:

FIG. 15 is a diagram of an exemplary photonic crystal fibre structure S11, according to an embodiment of the present invention, which has a nineteen-cell core defect and which exhibits two-fold rotational symmetry by virtue only of eight bead-like formations on a core boundary of the structure;

FIG. 16 is a diagram of an exemplary photonic crystal fibre structure S12, according to an embodiment of the present invention, which has a seven-cell core defect and which exhibits two-fold rotational symmetry by virtue only of two opposite cladding cells having thicker walls;

FIG. 17 is a diagram of an exemplary photonic crystal fibre structure S13, according to an embodiment of the present invention, which has a seven cell core defect and which exhibits two-fold rotational symmetry by virtue only of four bead-like formations in a core boundary region of the structure;

FIG. 18 is a diagram of an exemplary photonic crystal fibre structure S14, according to an embodiment of the present invention, which exhibits two-fold rotational symmetry by virtue of a core boundary region having an inner four-fold rotational symmetry and an outer six-fold rotational symmetry;

FIG. 1 is a diagram of an exemplary photonic crystal fibre structure S1, which exhibits six-fold rotational symmetry about a central air core, surrounded by cladding comprising a periodic array of air holes embedded in an all-silica matrix. It will be appreciated that only an inner portion of the cladding is shown.

The structure S1, which will be discussed in more detail below, has the mode spectrum shown in FIG. 2. The mode spectrum may be produced using a Finite-Difference Time Domain (FDTD) algorithm. This technique has been extensively used in the field of computational electrodynamics, and is described in detail in the book "Computational Electrodynamics: The Finite-Difference Time-Domain Method", A. Taflove & S. C. Hagness, ©2000 Artech House. The FDTD technique may be readily applied to the field of PBG fibres and waveguides by those skilled in the art of optical fibre modelling.

Figure 2:
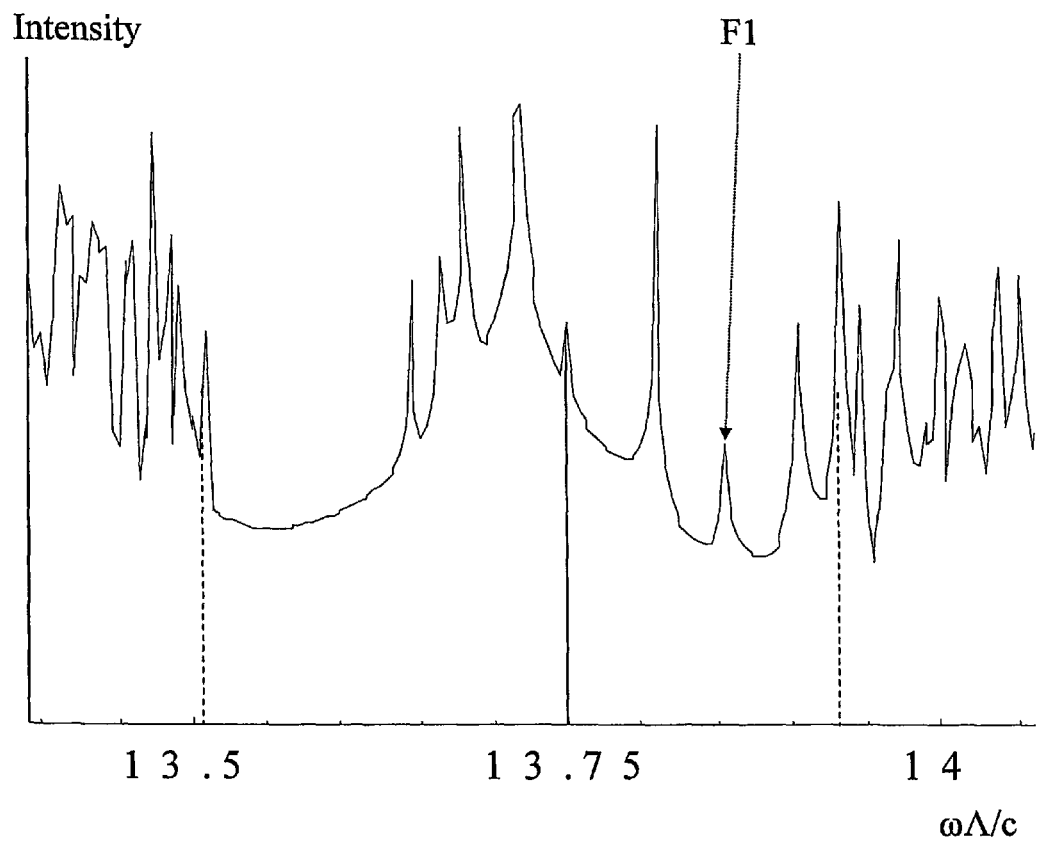
FIG. 2 is a diagram of a mode spectrum of the fibre structure S1, identifying a fundamental mode of the structure.

With reference to the spectrum in FIG. 2, which is plotted for a value of $\beta V=13.75$, where $\beta$ is a propagation constant and $V$ is the pitch of the cladding of the structure S1, each vertical spike indicates the presence of at least one mode at a corresponding normalised frequency $\omega V/c$, where $\omega$ is the frequency and c is the speed of light. The spike heights on the spectrum relate to the strength of the response of a mode to a given input stimuli used to generate the spectrum. In some cases, due to their proximity, multiple modes may appear on the spectrum as a single spike or as a relatively thicker spike compared with other spikes in the spectrum. As such, the mode spectrum should be taken to provide only an approximation to the actual numbers of modes that exist, which is satisfactory for enabling a general comparison between spectra herein.

On the spectrum in FIG. 2, a 'light line', where $\beta=\omega/c$, for the structure S1 is shown as a solid vertical line at $\omega\nabla/c=13.75=\beta\nabla$, and band edges, which bound a bandgap, are represented as two dotted vertical lines, one on either side of the light line.

Any modes that fall between the light line and the lower band edge (that is, to the left of the light line) will concentrate in the glass and be evanescent in air whereas the modes that are between the light line and the upper band edge (that is, to the right of the light line) may be air-guiding.

As shown in the spectrum in FIG. 2, there are approximately six modes between the light line and the lower band edge for the structure S1 and approximately five modes between the light line and the upper band edge (taking the thicker spikes as two possible modes). It is clear that the structure S1 supports a significant number of modes, some of which could be air-guiding; although, it is unlikely that all of these modes would be significantly excited by a given light input.

Analysis of the modes within the bandgap of the spectrum reveals that the spike marked 'F1' is an air-guiding mode, which most closely resembles the form of a fundamental mode in a typical standard optical fibre. As in a standard optical fibre, the mode is found to be degenerate, being one of a pair of very similar polarisation states, hereafter referred to as F1a and F1b, falling at $\omega\nabla/c=13.843$.

Figure 3:
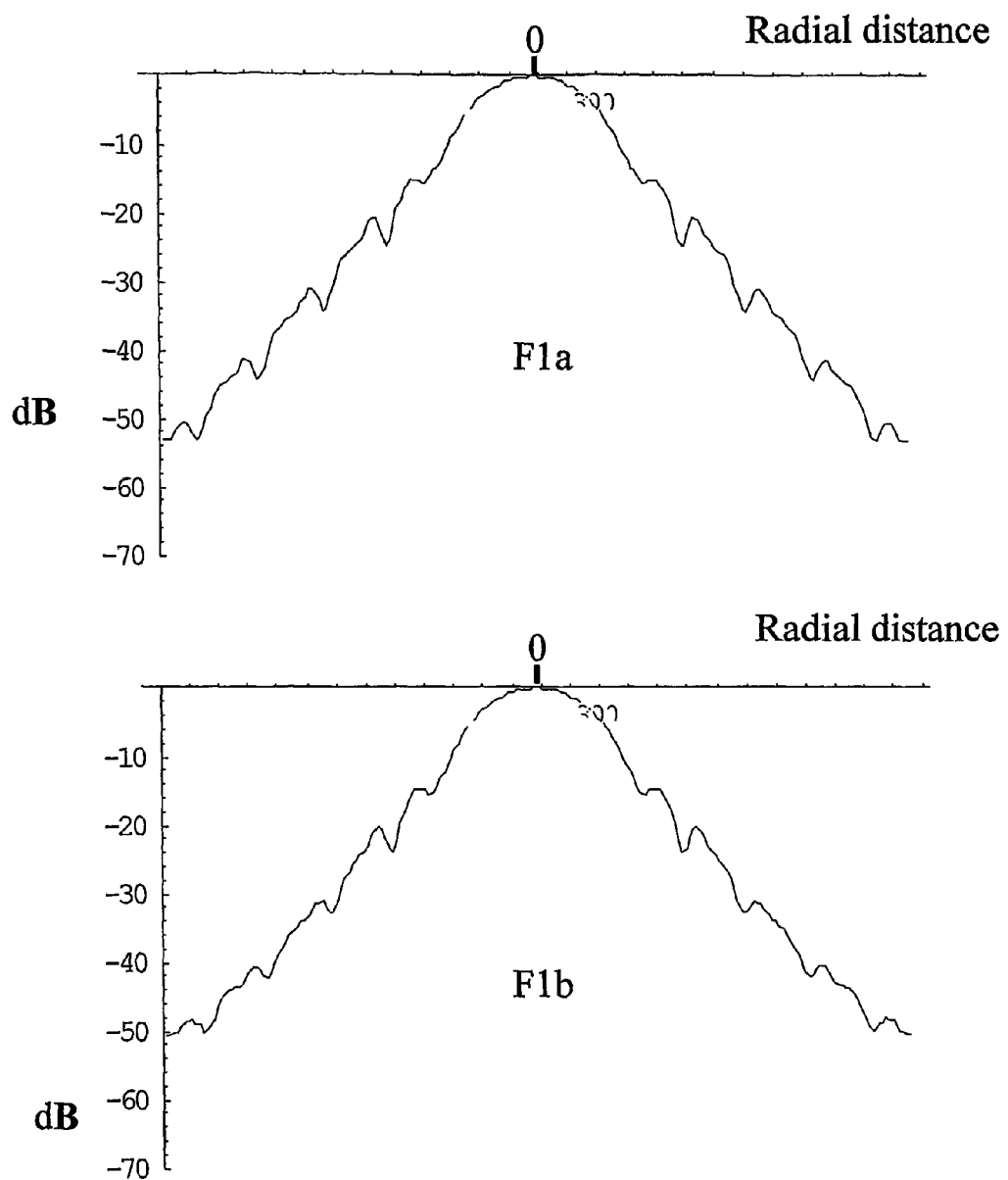
FIG. 3 shows graphs of the mode field intensity of the polarisation states of the fundamental mode for structure S1.

The two orthogonal polarisation states, F1a and F1b, are presented as azimuthally-averaged field intensity plots on the graphs in FIG. 3. The graphs are normalised, with maximum intensity being at 0 and the y-axis scale being in dB. The x-axis is a linear length scale of fibre cross-section radius, with the mid-point coinciding with the centre of the core defect region.

As seen in FIG. 3, the polarisation states F1a and F1b are very similar and clearly comprise Gaussian-like field intensity profiles. The profiles have intense, central regions, which fall in intensity rapidly away from their centres. The field intensity of the two polarisation states F1a and F1b decays by a similar amount, of around 51 dB, at the edge of the graphs.

The fibre structure S1 is an example of a non-birefringent structure that will be used hereafter as a reference against which embodiments of the present invention may be compared.

Figure 1:
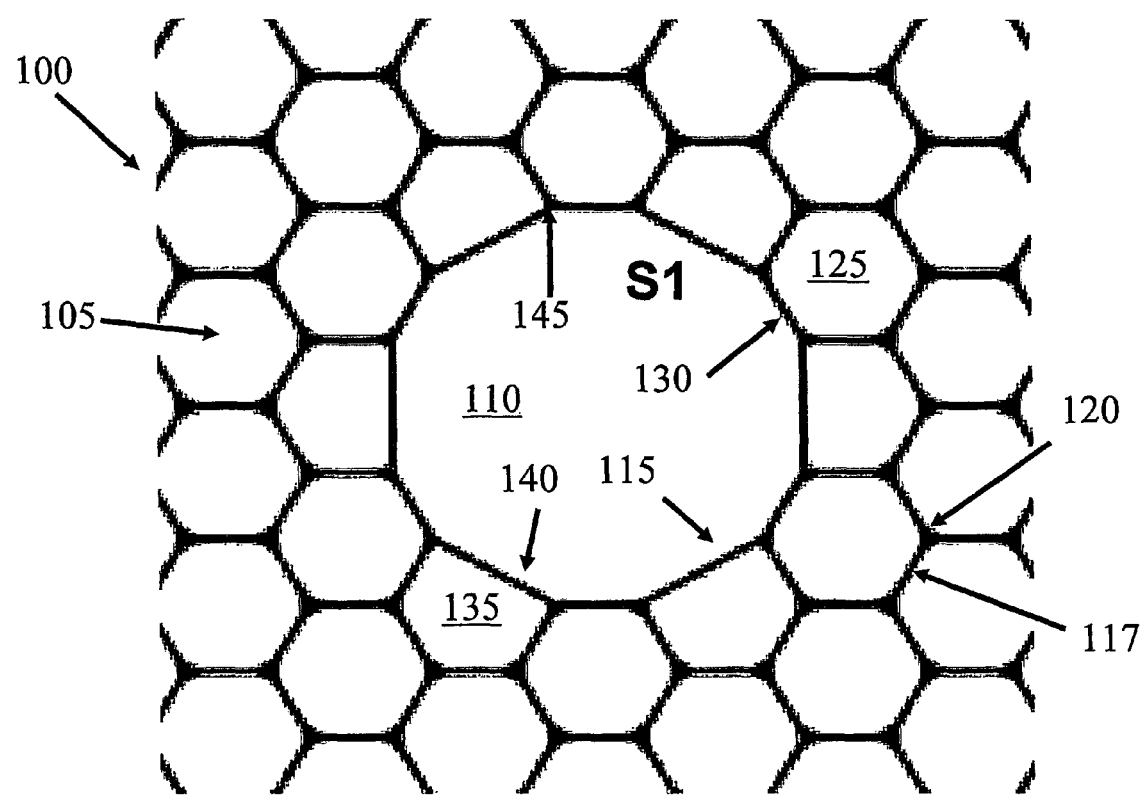
FIG. 1 is a diagram of an exemplary photonic crystal fibre structure S1, which exhibits six-fold rotational symmetry, and which comprises an air core and a cladding of air holes embedded in an all-silica matrix.

The present inventors apply two useful figures of merit to silica and air PBG fibre structures of the kind shown in FIG. 1.

F-factor has been identified by the present inventors as a useful figure of merit which relates to how the guided light propagating in a PBG fibre is subject to scattering from small scale irregularities of the air-silica interfaces. F-factor, which has units herein of $\nabla^{-1}$, is also believed to be a strong indicator of likely mode-coupling characteristics of a PBG-fibre. F-factor can be described as:

$$F = \left(\frac{\varepsilon_0}{\mu_0}\right)^{1/2} \frac{\oint_{hole\ perimeters} ds |E_0(r')|^2}{\int_{x-section} dS(E_0 \wedge H_0^*) \cdot \hat{z}}$$

The inventors have found that a comparison of the interface scattering strength from guided modes of different fibres with similar interface roughness properties can be based purely on the F-factor. Indeed, the thermodynamic limit to surface roughness is not expected to vary significantly with the details of the fibre geometry, so that the F-factor can be used directly as a figure of merit, where a lower F-factor is better, for any fibre which has interfaces which cause scattering and contribute to loss.

A second figure of merit is the fraction of light-in-air (as opposed to light in glass) a mode experiences. It will be understood that light-in-air is not the same as light in the core; since light may be in air in the cladding instead of or as well as the core. Of course, for a Gaussian mode, a high value for fraction of light in air will typically correspond to a high value of light in the core as well.

The fraction of light-in-air and F-factor of a particular structure can be measured. The method of measuring fraction of light-in-air involves taking a near-field image of light as it leaves the structure, overlaying it on a scanning electron micrograph (SEM) or atomic force microscopy (AFM) image of the structure and directly calculating the fraction of light-in-air from the overlap of the two images, although care needs to be taken since the field can vary rapidly across the boundary between air and glass. Such techniques will be readily apparent to those skilled in the art of optical fibre measurement methods.

The fraction of light-in-air and F-factor can also be calculated indirectly for a real fibre structure by the following method. A SEM or AFM image is taken of the cross-sectional structure of the fibre in question. An accurate representation of the structure, suitable for use in computer modelling, is obtained from the SEM by estimating the position of the structural boundaries throughout the cross-section. Based on this representation, the mode field can be simulated by solving Maxwell's vector wave equation for the fibre structure, using known techniques. In brief, Maxwell's equations are recast in wave equation form and solved in a plane wave basis set using a variational scheme. An outline of the method may be found in Chapter 2 of the book "Photonic Crystals—Molding the Flow of Light", J. D. Joannopoulos et al., ©1995 Princeton University Press. This knowledge of the electric and magnetic field distributions enables both the numerator and denominator in the F-factor equation above to be calculated. The fraction of light in air may also be calculated by superimposing the modelled mode on the modelled structure.

For the individual polarisation states F1a and F1b of the fibre structure S1 in FIG. 1, the F-factors are around $0.57\nabla^{-1}$ and the light-in-air fractions are around 0.98.

Considering the field intensity plots in FIG. 3, in combination with the F-factors and the light-in-air fractions for structure S1, it is evident that the two polarisation states F1a and F1b closely resemble one another in their properties, which is as would be expected for orthogonal polarisation states guided by a six-fold rotationally-symmetric and non-birefringent structure.

Considering in more detail the fibre structure S1 in FIG. 1, the dark regions represent fused silica glass and the light regions represent air holes in the glass. As illustrated, the cladding 100 comprises a periodic, triangular array of generally hexagonal cells 105 surrounding a so-called seven-cell core defect 110. A boundary region 115 is at the interface between the cladding 100 and the core defect 110. The core defect 110 has twelve sides—alternating between six relatively longer sides and six relatively shorter sides—and is formed by omitting or removing seven central cells, comprising an inner cell and the six cells that surround the inner cell, from the otherwise periodic cladding structure. The cells would have typically been removed or omitted in known fashion from a pre-form prior to drawing the pre-form into the fibre.

The boundary region 115 is characterised by the form of the cladding from which the seven cells have been removed. It is clear that the boundary region 115 is a simple function of the selected cladding structure and the fact than there are seven missing cells. In addition, surface tension in the glass and air pressure in the holes typically plays a part in forming the boundary region 115 during the fibre drawing process.

As the skilled person will appreciate, although a cell 105 comprises a bounded void, or a hole, for example filled with air or under vacuum, the voids or holes may alternatively be filled with a gas or a liquid or may instead comprise a solid material that has a different refractive index than the material that surrounds the hole. Equally, the silica glass may be doped or, as indicated above, replaced by a different glass or other suitable material such as a polymer.

The structure S1 is substantially periodic away from the core defect and boundary region. However, as discussed in Litchinitser et al., Opt Lett., Vol. 27 (2002) pp. 1592-1594 photonic bandgaps may be achieved in non-periodic structures. The properties of the core-cladding boundary are also important in non-periodic PBG structures and the invention is not limited to substantially periodic structures but encompasses structures with some or even a high degree of aperiodicity or irregularity in the cladding structure. Such aperiodicity or irregularity may be designed into the structure or result from an imperfect manufacturing process.

Hereafter, and with reference to structure S1 of FIG. 1, a region of glass 117 between any two holes is referred to as a "vein" and a region of glass 120 where at least three veins meet is referred to as a "node".

The boundary 115 comprises the inwardly-facing veins of the innermost ring of cells that surround the core defect 110.

In practice, for triangular lattice cladding structures that have a large air-filling fraction, for example above 0.85, most of the cladding holes 105 assume a generally hexagonal form, as shown in FIG. 1, and the veins are generally straight and relatively thin. However, embodiments of the present invention are not limited to silica-air structures, relatively high air-filling fractions or to hexagonal cladding holes. These properties, particularly for PBG fibres, will vary depending on various factors. In general, in a typical PBG fibre, a preferred PBG typically possesses the following properties:

(1) it is wide enough, as measured by a width $\Delta\beta$ of the gap at a chosen wavelength $\lambda$, to induce a sufficient decay rate of the mode field into the cladding. This renders a manageable number of cladding periods sufficient to contain the light. The PBG width is also chosen to be wide enough to suppress as far as possible scattering into cladding modes induced by the inevitable fluctuations in a fibre; such fluctuations are found to possess a power spectrum with significant power content at length scales which correspond to changes of $\beta$ from that of a guided mode of interest to values still lying within the PBG;

(2) it is not so wide that an unmanageably large number of higher order guiding modes are introduced into the waveguide. In practice, for desirable properties of a guided mode of interest (e.g. mode area, light in air fraction, F-number and dispersion), the presence of some higher order core modes is generally unavoidable; and (3) the band width over which a guided mode of interest remains within the PBG is well guided, and sufficiently separated from any other core modes (if present), is sufficiently broad for the application of interest.

For silica-air PBG fibres, the criteria are typically fulfilled when the cladding possesses a relatively high air filling fraction (for example greater than 85%) and an appropriate crystal structure such as a triangular arrangement of air holes, with each hole having an approximately circular cross section. A resulting PBG typically has a broad overlap with the air light line $\omega=\beta c$, implying that the potential operational band width is particularly high—a band width of over 15% of the centre frequency is achievable. Furthermore, exploitation of such a PBG typically corresponds to normalized frequencies within the range $\omega\nabla/c=12\text{-}20$, so that a cladding pitch required (in a periodic cladding) is relatively large, being typically 2-3.5 times the operating wavelength. This renders the structure relatively easy to fabricate.

Other silica-air designs, which typically involve a lower air filling fraction, can give rise to higher order PBG which overlap the air light line. These, however, generally do not possess such a broad bandwidth for air guiding, are more sensitive to perturbations in the structure and there may be several other PBG present at the wavelength of interest. Such PBG can themselves induce unwanted waveguide modes within the core or close to a core boundary.

For higher refractive index glass (e.g. n=2.7) and air designs, the lowest order PBG for a practical cladding air filling fraction does not typically overlap with a respective air/light line, so that a higher order PBG would need to be utilised for light guidance in the core. This typically involves a cladding air filling fraction which is lower than for optimum silica-air designs. For example, filling fractions even as low as 0.3 can give rise to favourable higher order PBG. A suitable design will typically possess a higher order PBG which has a wide overlap with the air/light line, yet which is not so broad that it introduces too many higher order core modes. A suitable design should minimize the occurrence of other PBG at the wavelengths of operation. The pitch of the cladding (for periodic claddings) required to produce the PBG at the required wavelength range may also be a consideration.

Reverting to FIG. 1, the cells forming the innermost ring around the boundary of the core defect 110, which are referred to herein as "boundary cells", have one of two general shapes. A first kind of boundary cell 125 is generally hexagonal and has an innermost vein 130 that forms a relatively shorter side of the boundary 115. A second kind of boundary cell 135 has a generally pentagonal form and has an innermost vein 140 that forms a relatively longer side of the boundary 115.

The cells 125 & 135 around the core defect region 110 adopt two different shapes naturally due to surface tension in the glass during the manufacturing process.

In structure S1, there are twelve boundary cells and twelve nodes 145, which are referred to herein as "boundary nodes", around the core defect boundary 115. Specifically, as defined herein, there is a boundary node 145 wherever a vein between two neighbouring boundary cells meets the boundary 115. These boundary nodes 145 have slightly smaller diameters than the cladding nodes 120. For the present purposes, the veins 130 & 140 that make up the core boundary are known as "boundary veins".

With reference to structure S1, it is apparent that a boundary region, between a core defect and a cladding region, can be thought of as comprising the boundary nodes 145 and boundary veins 130, 140 around the core defect. However, it is also apparent that a boundary region may be thought of as comprising the boundary cells 125, 135 around the core defect. It will be appreciated that the boundary cells 125, 135, do not tile onto the cladding structure, which clearly differentiates these cells from the remainder of the cladding structure, which, in this example, is a triangular lattice of air holes.

The structure S1 and each of the following examples of different structures closely resemble practical optical fibre structures, which have either been made by the present inventors or may be made according to known processes or the processes described hereinafter. Unless otherwise indicated, the structures share the following common characteristics:

an underlying pitch $\nabla$ of the cladding chosen between values of approximately 3 μm and 6 μm (this value may be chosen to position core-guided modes at an appropriate wavelength for a particular application);

a thickness t of the cladding veins of 0.0548 times the chosen pitch $\nabla$ of the cladding structure (or simply 0.0548$\nabla$);

an air-filling fraction (AFF) in the cladding of approximately 0.875.

Figure 4:
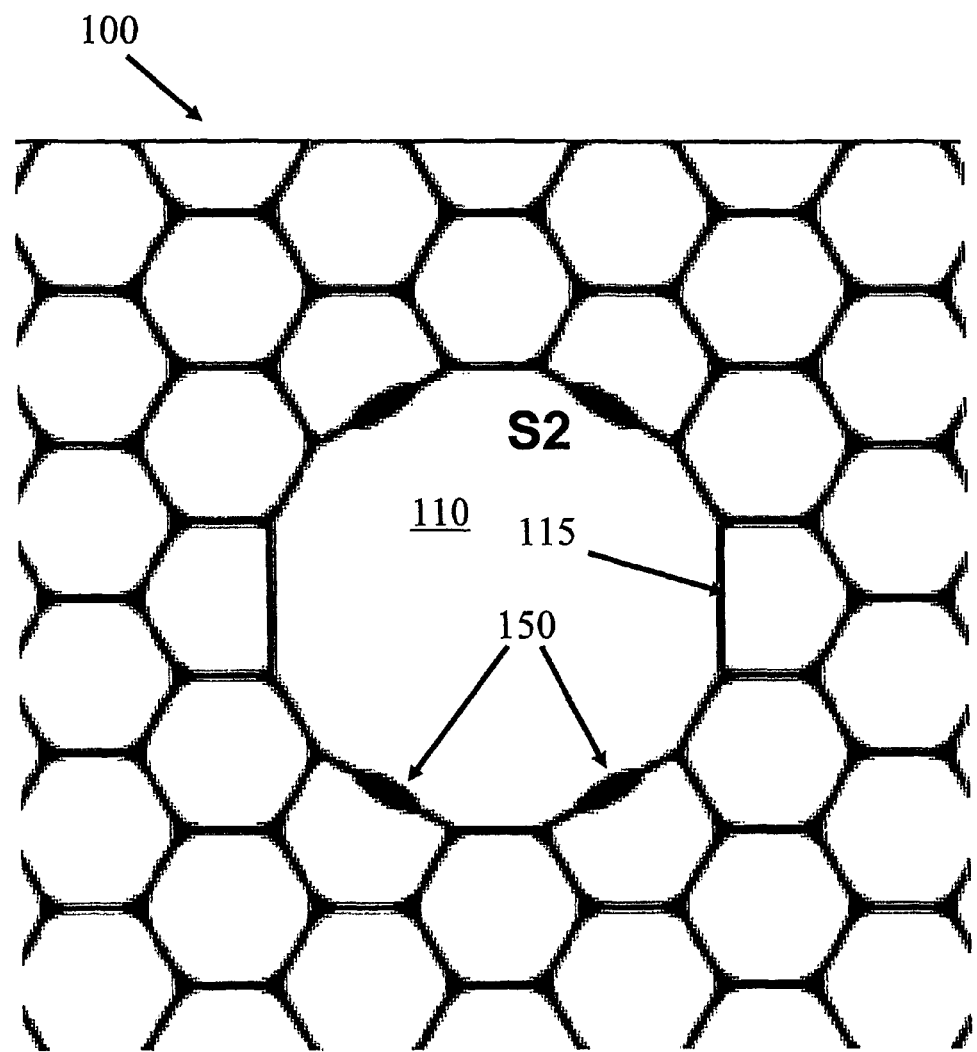
FIG. 4 is a diagram of an exemplary photonic crystal fibre structure S2, according to an embodiment of the present invention, which exhibits two-fold rotational symmetry by virtue only of four bead-like formations on a core boundary of the structure.

FIG. 4 is a diagram of a transverse cross section of a fibre structure S2 according to a first exemplary embodiment of the present invention. As can be seen, the cladding 100 and the general form of the core 110 are the same as in the structure S1 and, accordingly, share the same reference numerals as S1. The fibre structure S2, however, includes pronounced, elliptical, bead-like formations 150 along four of the six longer boundary veins that are associated with the pentagonal boundary cells. The beads 150 are arranged as two spaced apart, opposite pairs, so that the boundary 115 has only two-fold rotational symmetry about the centre of the core region 110. The beads 150 are half the length of the boundary veins along which they are found and their widths are one third of their length.

The boundary configuration of the fibre structure S2 causes the fibre structure to exhibit an overall two-fold rotational symmetry about the centre of the core region 110.

It will be appreciated that the beads 150 are not characteristic features of the cladding; they would not have resulted simply from omitting seven cells from the cladding structure. As will be described below, specific process steps need to be taken to achieve the core boundary arrangement of the structure S2.

fall in intensity rapidly away from their centres. However, unlike F1a and F1b, F2a and F2b experience significantly different decays into the cladding. As can be seen, by the edge of the graphs, which is the same distance from the centre of the core for each polarisation state, decays by in excess of 60 dB whereas F2b decays by only around 50 dB.

Clearly, the two polarisation states F2a and F2b of the fundamental mode of structure S2 exhibit significantly different field decays into the cladding and, therefore, experience differential confinement (or leakage) loss. Or, put another way, the two polarisation states have different field intensities at a given radial distance from the centre of the fibre. This characteristic of a birefringent PBG fibre structure has not been reported elsewhere as far as the inventors are aware. Differential confinement loss per se has been reported in relation to solid core, effective index guiding photonic crystal fibres, in "Polarisation-Dependent Confinement Losses in Actual Holey Fibres", Koshiba et al., IEEE Photonics Technology Letters, Volume 15, Number 5, May 2003, pp 691-693. In this paper, the confinement loss difference between the so-called fast and slow axes is attributed to effective refractive index differences due to different sized air holes in the cladding of the structure under investigation. This kind of structure is similar to a conventional birefringent optical fibre, which is fabricated to have form birefringence in the core or cladding. However, as the skilled person will appreciate, guidance properties of index-guiding photonic crystal fibres are significantly different compared to guidance properties of PBG fibres. In particular, the difference in confinement loss in the structure S2 cannot be attributed to birefringence in the cladding structure.

The applicants have investigated the structure S2 for a number of normalised frequencies (ω/c)$\nabla$, revealing the following results:

TABLE 1

| Normalised Frequency (ω/c)Λ | ΔβΛ | Approx. Beat length (mm) @ 1550 nm | Lowest F-factor (Λ$^{-1}$) (Difference) | Highest % Light-in-air (Difference) | Greatest Decay (Difference) |
| --- | --- | --- | --- | --- | --- |
| 13.106 | 0.002 | 8.9 | 0.26 (1.14) | 98.8 (5.0) | 56 (8) |
| 13.356 | 0.008 | 2.6 | 0.32 (0.09) | 98.6 (0.2) | 58 (0) |
| 13.599 | 0.012 | 1.8 | 0.21 (1.24) | 99.1 (6.4) | 62 (13) |
| 13.848 | 0.007 | 3.2 | 0.21 (0.22) | 99.1 (1.1) | 62 (13) |

Figure 5:
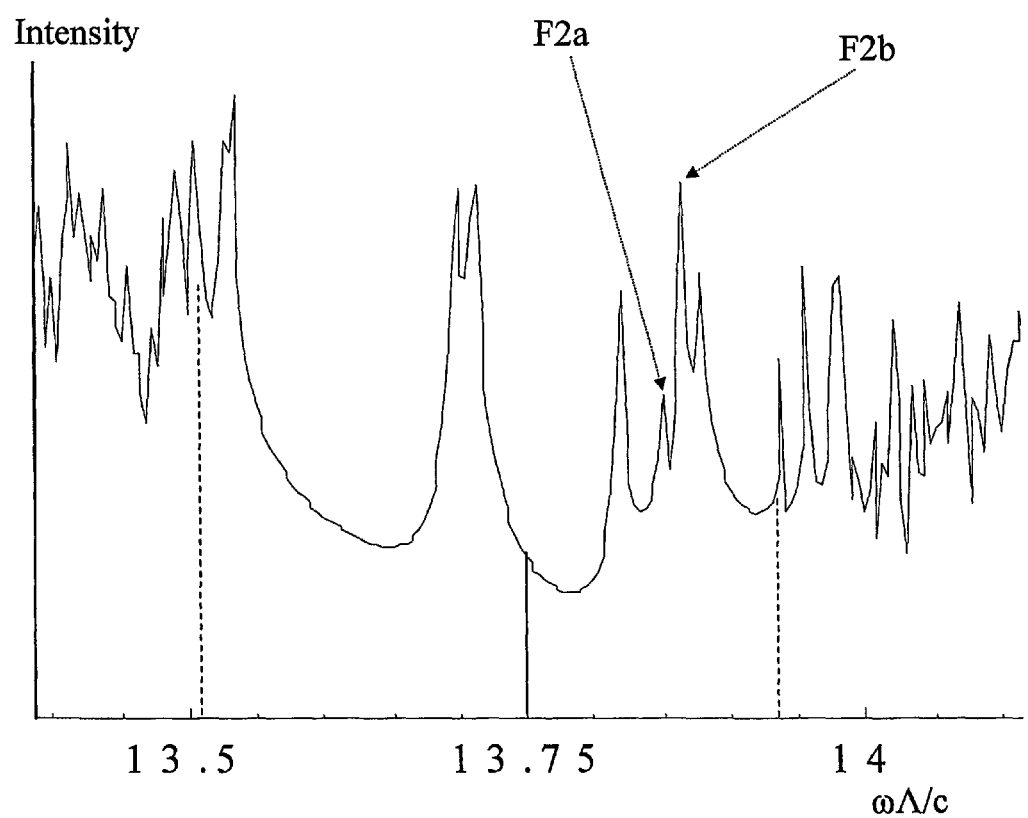
FIG. 5 is a diagram of a mode spectrum of the fibre structure S2, identifying a fundamental mode, which has polarisation states at different values of $\omega V/c$.

FIG. 5 shows the mode spectrum for the fibre structure S2, plotted for a value of β$\nabla$=13.75. The spikes marked F2a and F2b are found to be the two polarisation states of a fundamental mode for the structure S2. Unlike for structure S1, the polarisation states are split by a significant degree; F2a being at ω$\nabla$/c=13.844 and F2b being at ω$\nabla$/c=13.851. On the basis of these figures, an approximate beat length for structure S2, operating at 1.55 μm, is found to be 3.2 mm, indicating that the structure exhibits a significant degree of birefringence.

The structure S2 shown in FIG. 4 is birefringent only by virtue of the core boundary being two-fold symmetric, whereas the underlying rotational symmetry of the core defect region and the cladding region, independent of the modified boundary, is six-fold.

Figure 6:
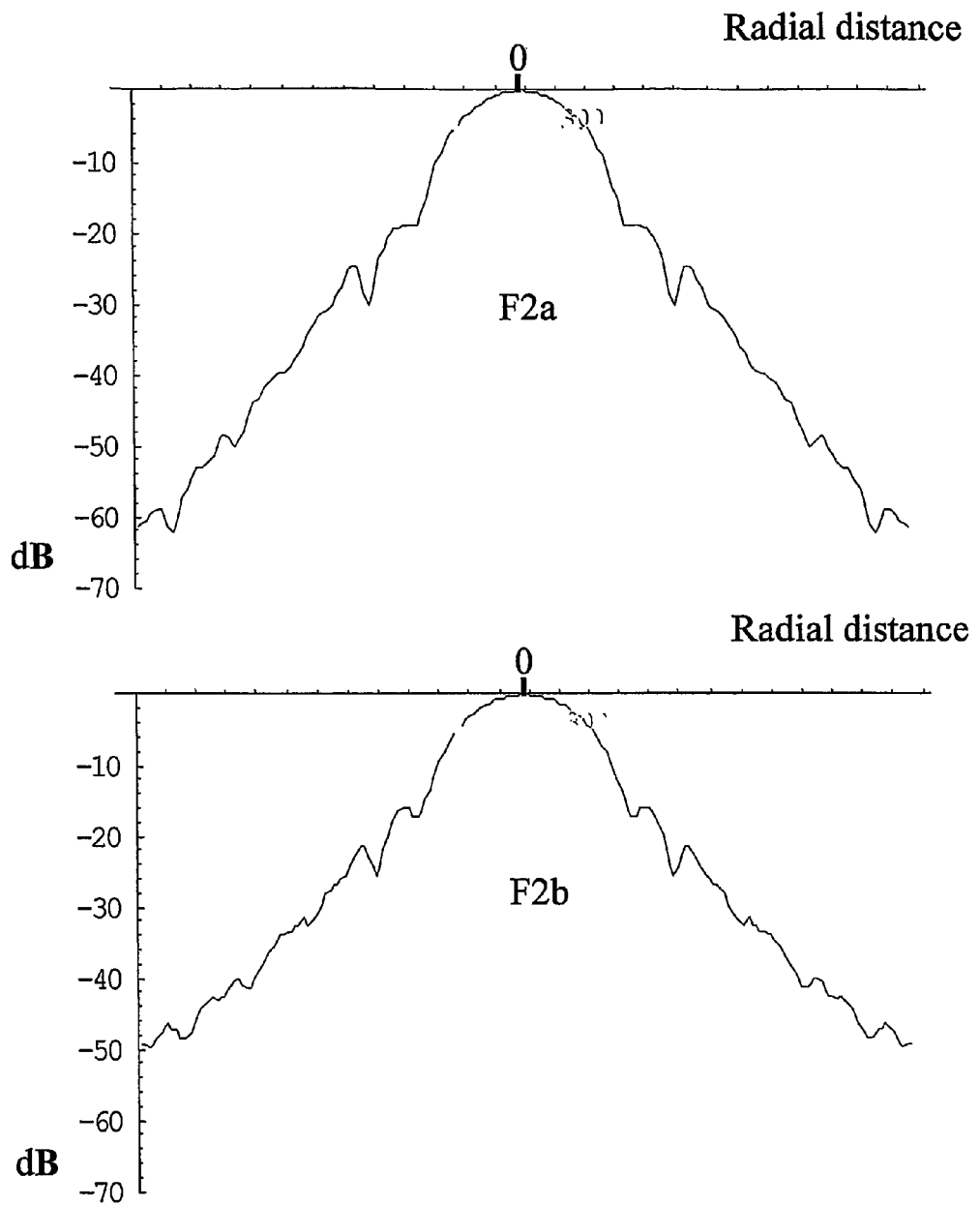
FIG. 6 shows graphs of the azimuthally averaged mode field intensity of the polarisation states of the fundamental mode for structure S2.

FIG. 6, which is similar to FIG. 2, shows two graphs of azimuthally-averaged field intensity for polarisation states F2a and F2b respectively.

The polarisation states F2a and F2b are similar to F1a and F1b in the respect that they comprise Gaussian-like field intensity profiles, which have intense central regions, which In Table 1, Δβ$\nabla$ is the split in β$\nabla$ between the polarisation states of a fundamental, Gaussian-like mode at the chosen normalised frequency and in each row of the fourth, fifth and sixth columns, the first value is the maximum or minimum (as the case may be) of the two polarisation states and the value in brackets is the difference in value between the two polarisation states.

It is notable from Table 1 that the characteristics of the fibre vary significantly with normalised frequency (ω/c)$\nabla$. For example, at (ω/c)$\nabla$=13.106, the two polarisation states are relatively close in β$\nabla$ terms and the fibre is not strongly birefringent. In contrast, at (ω/c)$\nabla$=13.356, the fibre is highly birefringent and the two polarisation states behave quite differently. At (ω/c)$\nabla$=13.599, the F-factor and light-in-air differentials are significant and the decay difference is marked. There appears to be a direct correlation between F-factor, light in air fraction and decay. There is, however, no apparent correlation between beat length and decay. For example, at (ω/c)$\nabla$=13.356, the structure S2 is birefringent, with a relatively short beat length of 2.6 mm, whereas the decay difference is zero. In contrast, at $(\omega/c)\nabla=13.599$ and $(\omega/c)\nabla=13.848$ the beat lengths are very different but the maximum decays and decay differences are the same.

The present inventors believe that this apparent lack of correlation between beat length and decay may be due to interactions between the core modes under investigation and surface states. By analogy, "Measurement of photonic bandgap fiber transmission from 1.0 to 3.0 µm and impact of surface mode coupling", Muller et al, CLEO 2003, paper QTuL2, opines that optical power from core modes is transferred to surface modes at certain wavelengths.

Figure 7:
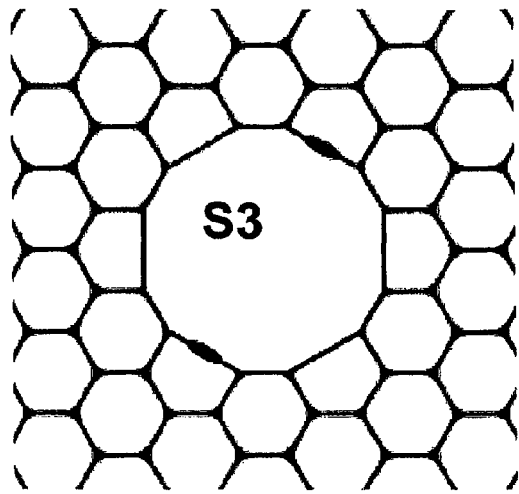
FIG. 7 is a diagram of an exemplary photonic crystal fibre structure S3, according to an embodiment of the present invention, which exhibits two-fold rotational symmetry by virtue only of two bead-like formations on a core boundary of the structure.

FIG. 7 is a diagram of another fibre structure S3, which exhibits birefringence, and is an exemplary embodiment of the present invention. The structure S3 is similar to structure S2 but has only two pronounced, elliptical, bead-like formations along two opposite longer boundary veins that are associated with the pentagonal boundary cells. The structure S3, by virtue of the core boundary alone, has two-fold rotational symmetry about the centre of its core region. A similar birefringent structure, according to an embodiment of the present invention, may have only one bead-like formation along one of its relatively longer sides.

As for structure S2, the beads in structure S3 are not characteristic features of the cladding, which would have resulted simply from omitting seven cells from the cladding structure.

Analysis of the characteristics of the structure S3 indicates that, as for structure S2, the degrees of birefringence and leakage losses vary significantly with normalised frequency $(\omega/c)\nabla$, as shown in Table 2. F-factors and light in air fractions are not shown in Table 2 due to their close correlation to leakage loss.

TABLE 2

| Normalised Frequency $(\omega/c)\Lambda$ | $\Delta\beta\Lambda$ | Beat length (mm) @ 1550 nm | Greatest Decay (Difference) |
| --- | --- | --- | --- |
| 13.219 | 0.017 | 1.2 | 56 (8) |
| 13.363 | 0.007 | 2.9 | 56 (5) |
| 13.601 | 0.003 | 6.6 | 58 (4) |
| 13.846 | 0.010 | 2.2 | 52 (2) |

As a general observation, it is evident that the degrees of birefringence of the structure, and decay differences of the cladding, can be varied significantly for a particular fibre structure by varying the form of the respective core boundary and the operating point (e.g. cladding pitch) of a fibre structure. The degree of decay difference may be varied simply by varying the outer radius of the cladding, for example by selecting an appropriate number of layers of cladding cells surrounding the core region. Obviously, there is a trade-off between the absolute confinement of a particular structure, which increases with additional layers of cladding cells, and decay difference.

The present inventors suggest that the mechanism by which the decay rate into the cladding of a polarisation state can be affected by the core boundary geometry is due to a symmetry matching between the field distribution of the state within the core and the field within the cladding. The latter field, within a PBG, can be represented as a superposition of modes of a complex band structure. Different sub-classes of the complex cladding band structure connect onto different field symmetries within the core region. Thus, as has been demonstrated above, even a non-birefringent cladding structure can lead to different field decay rates of the two polarisation states associated with a birefringent core boundary design.

Figure 8:
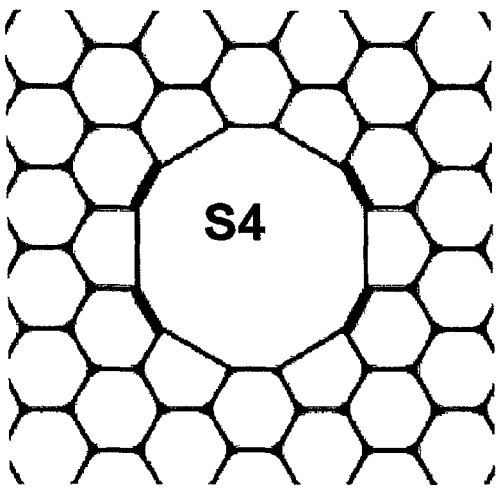
FIG. 8 is a diagram of an exemplary photonic crystal fibre structure S4, according to an embodiment of the present invention, which exhibits two-fold rotational symmetry by virtue only of four relatively thick regions on a core boundary of the structure.

FIG. 8 is a diagram of another birefringent fibre structure S4 according to an embodiment of the present invention. The structure S4 is similar to structure S2 but has thick boundary veins in place of the four boundary veins having pronounced beads. In this embodiment, the thickness of the thicker veins is $0.137\nabla$, which is 2.5 times the thickness of the other boundary and cladding veins.

An analysis of structure S4 reveals that beat lengths significantly below 10 mm and even below 5 mm may be achieved for this structure.

Figure 9:
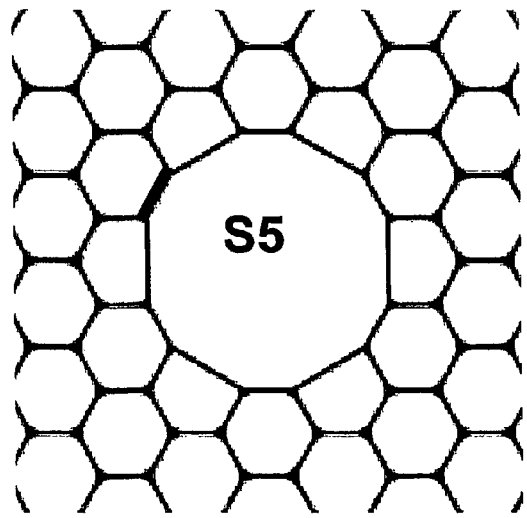
FIG. 9 is a diagram of an exemplary photonic crystal fibre structure S5, according to an embodiment of the present invention, which exhibits one-fold rotational symmetry by virtue only of one relatively thick region on a core boundary of the structure.

FIG. 9 is a diagram of another fibre structure S5 according to an embodiment of the present invention. The structure S5 has only one thick boundary vein on one relatively shorter boundary vein. Again, the thickness of the thicker vein is $0.137\nabla$, which is 2.5 times the thickness of the other boundary and cladding veins.

It will be appreciated that a combination of thick and thin boundary veins, according to structures S4 and S5, are not characteristic features of the cladding, which would have resulted simply from omitting seven cells from the cladding structure.

Figure 10:
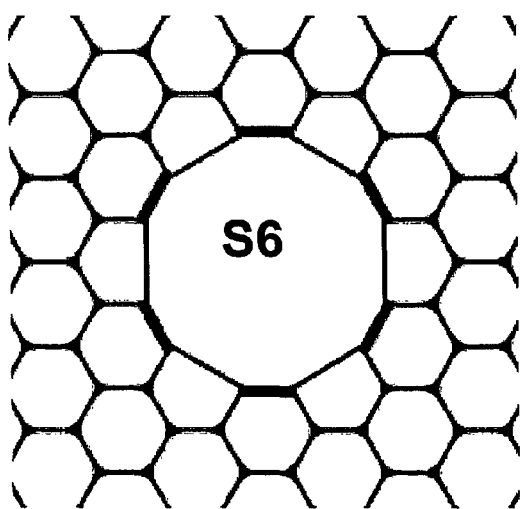
FIG. 10 is a diagram of an exemplary photonic crystal fibre structure S6, which is not an embodiment of the present invention, which exhibits six-fold rotational symmetry by virtue of there being six equally-spaced, relatively thick regions on a core boundary of the structure.

Of course, having boundary veins with pronounced beads, or thicker boundary veins, or both, is not limited to birefringent structures. For example, FIG. 10 is a diagram of a non-birefringent structure S6, which has a six-fold symmetric cladding, core boundary and core region, with all six of the longer boundary veins being thicker, $0.137\nabla$, veins.

Figure 11:
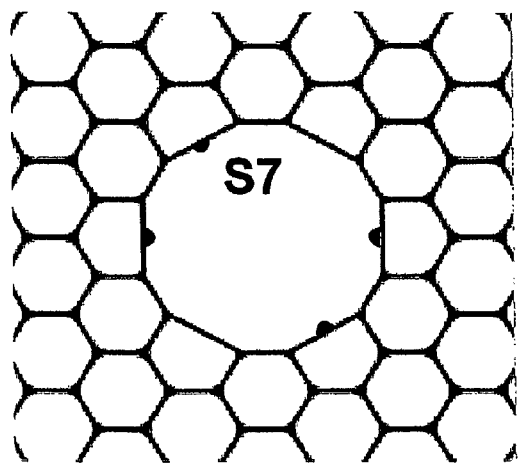
FIG. 11 is a diagram of an exemplary photonic crystal fibre structure S7, according to an embodiment of the present invention, which exhibits two-fold rotational symmetry by virtue only of four inwardly-facing, pronounced nodules on a core boundary of the structure.
Figure 12:
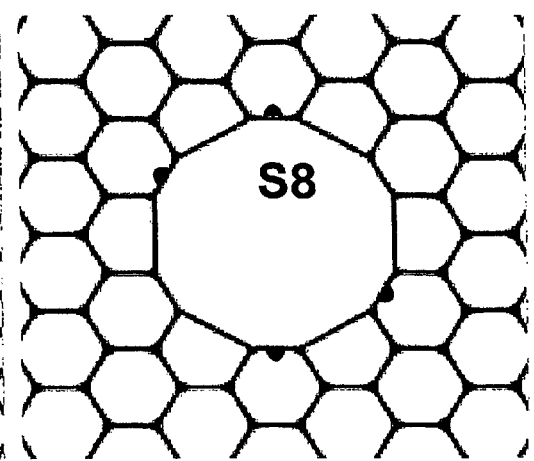
FIG. 12 is a diagram of an exemplary photonic crystal fibre structure S8, according to an embodiment of the present invention, which exhibits two-fold rotational symmetry by virtue only of four outwardly-facing, pronounced nodules on a core boundary of the structure.

FIG. 11 is a diagram of a structure S7, which is yet another exemplary embodiment of the present invention. In structure S7, a core boundary includes four inwardly-facing nodules, arranged as two opposing pairs of nodules, along four of the six relatively longer boundary veins. The arrangement of the nodules renders the structure S7 two-fold rotationally-symmetric. Similarly, FIG. 12 is a diagram of a structure S8, which is a further exemplary embodiment of the present invention, having outwardly-facing nodules, arranged as two opposing pairs of nodules, along four of the six relatively shorter boundary veins. In both structures S7 and S8, the underlying rotational symmetry of the core region and cladding structure is six-fold.

Figure 13:
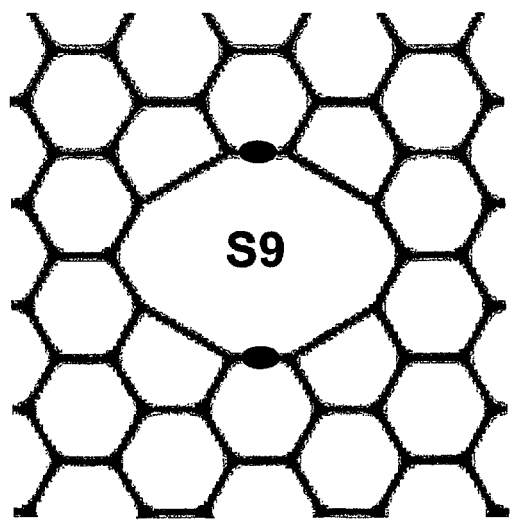
FIG. 13 is a diagram of an exemplary photonic crystal fibre structure S9, according to an embodiment of the present invention, which exhibits two-fold rotational symmetry by virtue both of having (1) a generally oval-shaped core region and (2) two bead-like formations on the core boundary, opposite one another on the minor axis thereof.

FIG. 13 is a diagram of a structure S9, which is an exemplary embodiment of the present invention. Unlike the embodiments described hereinbefore, structure S9 has a core region and a core boundary which are intrinsically two-fold rotationally-symmetric, independent of any additional features. The core region is formed by omission or removal of a group of four cells from a triangular lattice cladding structure. As can be seen, structure S9 resembles some prior art birefringent structures, which have an oval core region. However, in addition to having a two-fold rotationally-symmetric core region, the core boundary has beads along two opposite, relatively shorter sides of the core boundary, on a plane running through the centre of the core region and the shortest distance between core boundary sides. While these beads do not change the rotational symmetry of the structure, it is expected that they will change the degree of birefringence of the structure. Of course, such beads, or indeed other features, could be positioned at alternative or additional points around the core boundary to vary their effect as required. In any event, the beads are not characteristic features of the cladding, which would have resulted simply from omitting four cells from the cladding structure.

As a general principle, it is expected that the birefringence characteristics of many photonic crystal fibre structures, having a birefringent core, cladding, or both, may be varied by modifying a respective core boundary as described herein.

Figure 14:
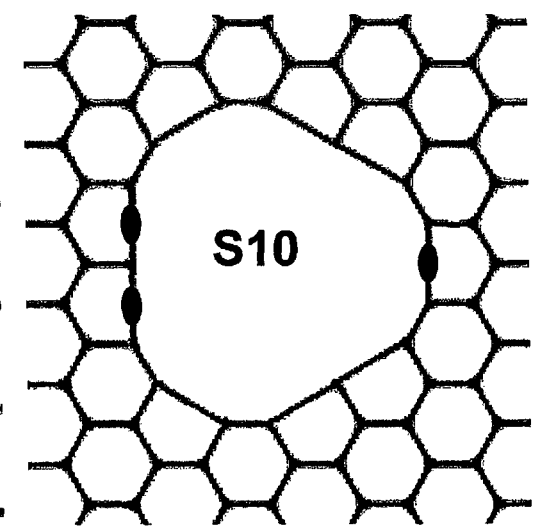
FIG. 14 is a diagram of an exemplary photonic crystal fibre structure S10, according to an embodiment of the present invention, which exhibits one-fold rotational symmetry by virtue of having a generally triangular-shaped core region and three bead-like formations on the core boundary.

FIG. 14 is a diagram of structure S10, which is a further exemplary embodiment of the present invention. The structure S10 has a generally triangular core region and core boundary, having an underlying three-fold rotational symmetry, formed by removal or omission of twelve inner cells from a triangular lattice cladding structure. The corners of the triangular core region are truncated, or flattened, as a natural consequence of the cladding structure.

The overall structure S10 has one-fold rotational symmetry due to there being three beads around the core boundary; arranged as two beads along two relatively longer boundary veins on one side of the triangle and one bead along an opposite boundary vein, which forms a flattened corner of the core boundary.

While a fibre structure having a three-fold rotationally-symmetric core region is not birefringent, it is expected that the addition of the beads, as illustrated in structure S10, would render the structure birefringent. Of course, any alternative arrangement of beads around the core boundary of a triangular core region, which reduces the rotational symmetry of the structure to below three, is expected to have the effect of introducing birefringence into the structure.

FIG. 15 is a diagram of a further structure, S11, which is an exemplary embodiment of the present invention. Unlike structures S4 to S12, which have seven-cell core defect regions in a triangular lattice cladding structure, structure S11 has a nineteen cell core defect region in a triangular lattice cladding structure, formed by omission or removal of an inner cell, the six cells that surround the inner cell and the twelve cells that surround the six cells.

Structure S11 is two-fold rotationally-symmetric by virtue of having eight beads along eight of the twelve relatively longer boundary veins, arranged so that there are two opposite, neighbouring pairs of relatively longer boundary veins, which do not have beads. A similarly birefringent structure may be made having a pair of beads along the two relatively longer veins of only two opposite sides, or, indeed, only one side, of the core boundary.

Structure S12, illustrated in FIG. 16, is an exemplary embodiment of the present invention and has a seven-cell core defect in a triangular lattice cladding. The structure S12 is two-fold rotationally-symmetric by virtue of having two opposite boundary cells having relatively thick walls compared with the walls of other boundary cells. The two boundary cells are pentagonal boundary cells, but hexagonal cells may be used instead. The boundary cells in this example form the boundary region of the structure.

Structure S13, illustrated in FIG. 17, is another seven-cell core defect structure in a triangular lattice cladding structure according to an exemplary embodiment of the present invention. In this example, there are four bead-like formations, arranged as two opposing pairs along four veins spaced from the boundary veins by one period of the cladding structure. The veins having the beads are the outwardly-facing veins of four of the six hexagonal boundary cells about the core defect. The boundary cells in this example form the core boundary region of the structure. Hence, it is apparent that the beads are positioned on the outer periphery of the core boundary region.

FIG. 18 is a diagram of a structure S14 according to a final exemplary embodiment herein of the present invention. A cladding region of the structure S14 comprises a triangular lattice of round air holes in a glass matrix material. Clearly, the structure S14 has a lower air-filling fraction than the preceding exemplary structures. A core defect in the structure S14 is generally circular apart from four equally-spaced nodules around an inner periphery of a core boundary region. Hence, an inner periphery of the core boundary region has a four-fold rotational symmetry and the cladding region has a six-fold rotational symmetry. The combination of the inner periphery of the core boundary region being four-fold rotationally symmetric and the cladding region being six-fold rotationally symmetric renders the overall structure two-fold rotationally symmetric. Another way of considering structure S14 is by thinking of the core boundary region as having an inner periphery which is four-fold rotationally symmetric and an outer periphery, defined by the cladding structure, as being six-fold rotationally symmetric. In the aggregate, therefore, the core boundary region itself can be thought of as being two-fold rotationally symmetric.

The present inventors suggest that there are many core boundary configurations possible for forming a fibre structure according to embodiments of the present invention. The features of the core boundary described above may be formed from the same material as the cladding matrix material, a doped variant, or even a different material entirely. In addition, or alternatively, the core boundary may exhibit two-fold rotational symmetry by virtue of material characteristics alone, for example a particular dopant concentration or material, which varies around the core boundary.

Fibres according to embodiments of the present invention may be made by adapting known stack-and-draw or extrusion techniques. In particular, there are a number of ways in which a bead or a nodule may be formed along the length of a boundary vein or in which a boundary vein may be made thicker or thinner along at least a part of its length. The following methods may also be used to make non-birefringent fibre structures, for example as illustrated in FIG. 10.

Figure 19:
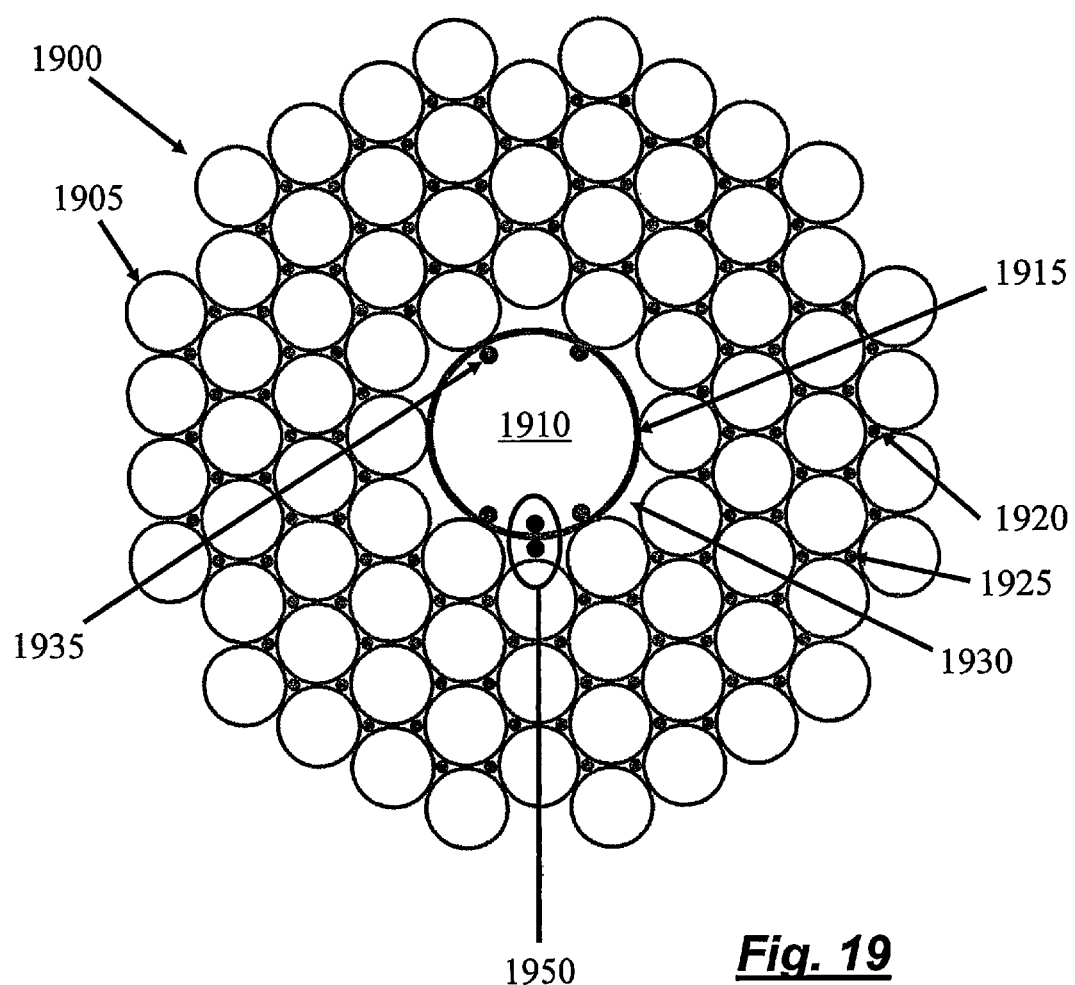
FIGS. 19 to 24 are diagrams of exemplary pre-form stacks that can be used to make photonic crystal fibre structures according to embodiments of the present invention.

One way of arranging a pre-form stack of capillaries 1900 to be drawn into a fibre structure similar to structure S2 is shown in FIG. 19. The cladding is formed by stacking round cross section capillaries 1905 in a close-packed, triangular lattice arrangement. The cladding capillaries 1905 have an outer diameter of 1.46 mm and a wall thickness of 40 μm. An inner region 1910 of the stack 1900 is defined by a large diameter capillary 1915 having an outer diameter of 3.62 mm and a wall thickness of 110 μm. The large diameter capillary 1915 supports the cladding capillaries 1905 while the stack 1900 is being formed and eventually becomes part of the material that forms a core defect boundary.

Interstitial voids 1920 that form at the locus of close-packed, triangular groups of three cladding capillaries are each packed with a glass rod 1925, which has a diameter of 0.2 mm. The rods 1925 are inserted into the voids 1920 after the capillaries 1905 have been stacked. The rods 1925 assist in forming cladding nodes, which have a diameter that is significantly greater than the thickness of resulting veins that meet at the nodes. Omission of a rod from a void in the cladding would lead to the formation of a cladding node having a significantly smaller diameter. Relatively large interstitial voids 1930 also form between the large diameter capillary 1915 and every other one of the innermost cladding capillaries.

As shown in FIG. 19, the large diameter capillary 1915 has attached to its inner surface four silica rods 1935. The rods 1935 are fused to the inside of the large diameter capillary 1915 in an additional heating step before the capillary is introduced to the stack 1900. When the stack 1900 is heated and drawn into fibre, these rods fuse with the large diameter capillary 1915, which itself fuses to the inwardly facing surfaces of the innermost cladding capillaries, to form core boundary beads of the kind described herein with reference to structures S2 and S3. The rods 1935 can be selectively positioned on the inside of the large diameter capillary 1915 to be aligned with either or both of the longer or shorter core boundary veins. Of course, within practical limits, any number of rods 1935 may be attached to the inside, or indeed outside, of the large diameter capillary 1915. If attached on the outside of the large diameter capillary 1915, the rods 1235 may be aligned with the larger interstitial voids 1930.

In principle, rods 1935 may be attached to the inside or to the outside of the large diameter capillary 1915. Indeed, rods 1950 (which are shown for illustration purposes only in FIG. 19) may be attached to both the inside and the outside of the same region of the large diameter capillary 1915, so that they form a relatively large bead on the core boundary.

The pre-form stack 1900 is arranged as described with reference to FIG. 19 and is then over-clad with a further, relatively thick-walled capillary (not shown), which is large enough to contain the stack and small enough to hold the capillaries and rods firmly in place. The entire over-clad stack is then heated and drawn into a so-called cane, during which time all the relatively large interstitial voids 1930 and any remaining voids between the glass rods 1925 and the cladding capillaries 1905, collapse due to surface tension. Then, the cane is, again, over-clad with a further, thick silica cladding and is heated and drawn into optical fibre in a known way. If surface tension alone is insufficient to collapse any of the interstitial voids, a vacuum may be applied to the interstitial voids, either or both during drawing of the stack into a cane or the cane into the fibre, for example according to the process described in WO 00/49436 (The University of Bath).

Figure 20:
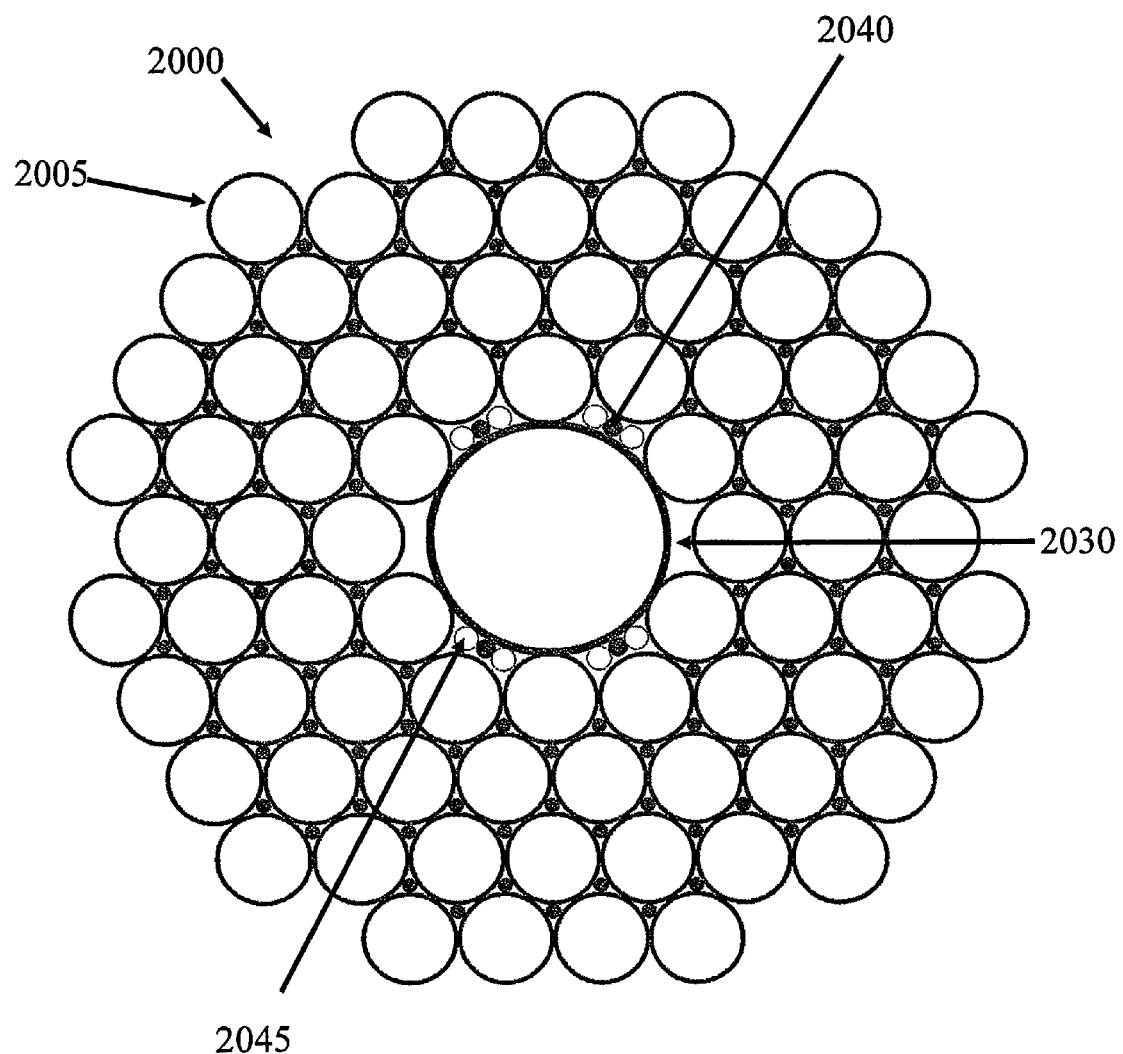

An alternative method of forming a pre-form stack 2000, which results in beads on shorter boundary veins only, is illustrated in FIG. 20. Generally, the stack 2000 comprises the same arrangement of cladding capillaries 2005, and a large diameter capillary, as stack 1700. In this example, however, four of the larger interstitial voids 2030, that form between every other one of the innermost capillaries and the large diameter capillary 2015, are packed with a glass rod 2040 and two thin-walled capillaries 2045, which act to hold the glass rod 2040 in a central position in the void during drawing down into a cane. Unlike in stack 1900, the rods 2040 and capillaries 2045 need not be fused to the large diameter capillary 2015 before it is introduced to the stack 2000. When the stack 2000 is heated and drawn down, the rods 2040 form beads on the shorter boundary veins and the thin-walled capillaries collapse entirely—if necessary with the application of a vacuum—adding an insignificant amount of material to the overall structure. Again, this technique may be used to pack any number of the larger interstitial voids 2030 in a pre-form stack to add additional glass volume, and is not limited to birefringent structures.

Figure 21:
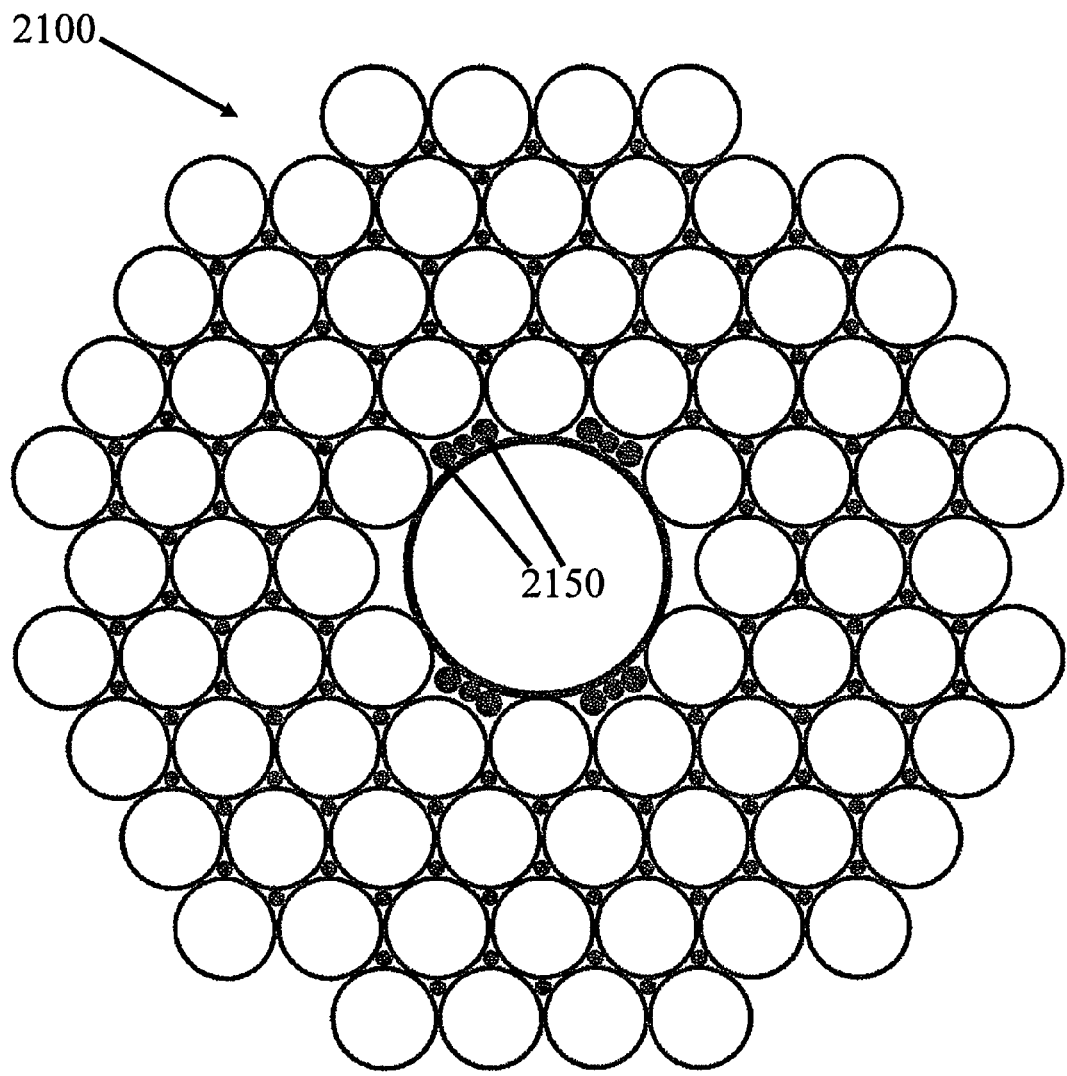

The pre-form stack of FIG. 20 may be modified slightly as shown in FIG. 21, whereby the thin-walled capillaries 2045, on either side of the glass rods 2040, are replaced by additional glass rods 2150. The effect is that, when the stack is drawn down to a fibre, the three glass rods in each void increase the overall thickness of the associated boundary vein, whereby thicker boundary veins are created, as in structures S4, S5 and S6.

Whether a rod, for example rod 1935 or 2040, becomes a bead along a core boundary, for example as in structures S2 and S3, or a relatively more pronounced nodule on the surface of a core boundary, for example as in structures S7 and S8, can be controlled by the fibre drawing conditions. For example, hotter drawing conditions under lower tension permit a rod and boundary to fuse completely, thereby forming a bead. In contrast, a colder draw under higher tension prevents complete fusing of the rod and core boundary, leaving the rod as a nodule on the surface of the core boundary in a final fibre structure. Clearly, a nodule can be arranged to form on an inner or outer periphery of a core boundary, depending on whether the respective rod is positioned on an inner or outer periphery of a large diameter capillary of the pre-form stack. The properties of a final fibre structure are expected to vary with bead and/or nodule size and placement. In general, the step of forming beads, or nodules, may be applied to any suitable fibre structure, be it birefringent or not.

Figure 22:
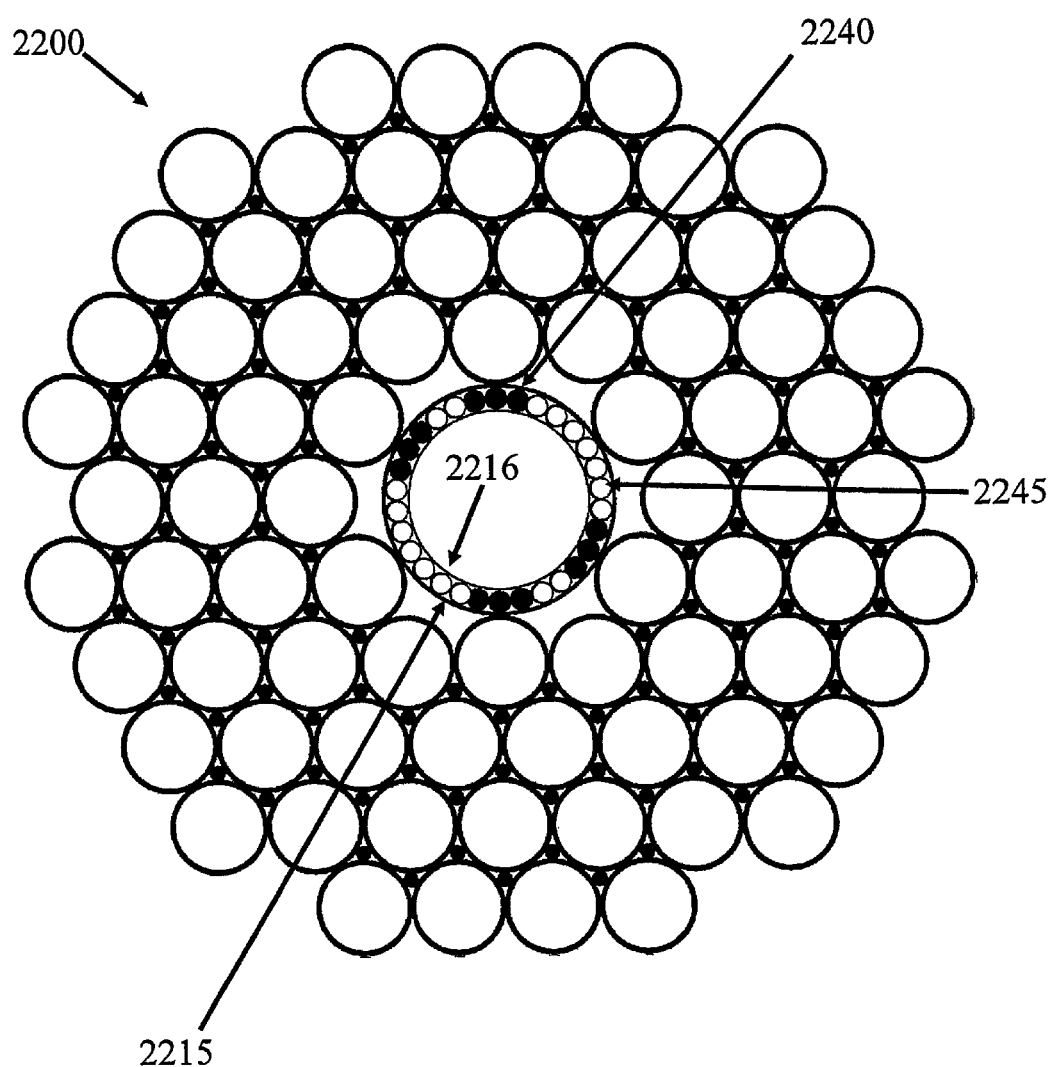

Thicker boundary veins may alternatively be formed in accordance with the pre-form stack 2200 shown in the diagram in FIG. 22. While the cladding capillaries are arranged in the same way as in previously described stacks, the inner region of the stack 2200 is formed using two concentric, slightly different sized, large diameter capillaries, 2215 and 2216. The larger of the large diameter capillaries supports the cladding capillaries, while the smaller of the large diameter capillaries fits within the larger one. The smaller large diameter capillary is sufficiently small that relatively small rods 2240 and capillaries 2245 can fit in the space between the larger and smaller large diameter capillaries.

When the stack 2200 is heated and drawn down into a cane and a fibre, the rods 1240 become thicker boundary veins and the capillaries 2245 collapse to form part of the thinner boundary veins.

Figure 23A:
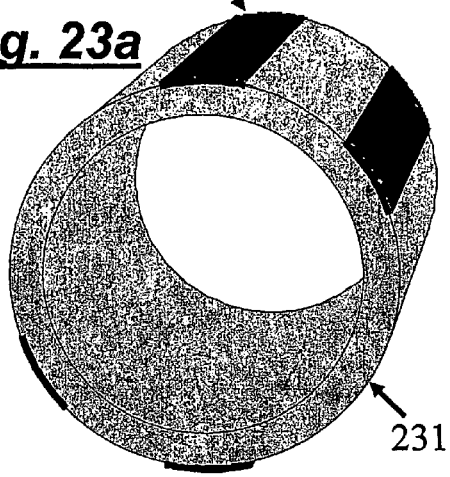
Figure 23B:
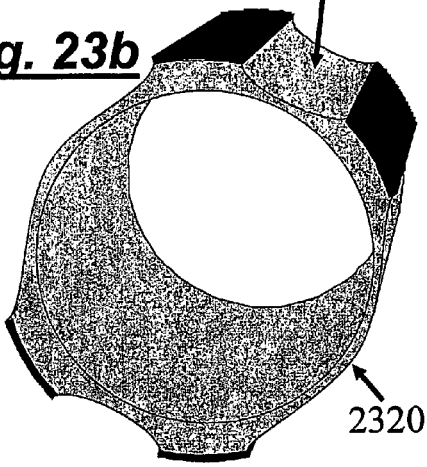
Figure 23C:
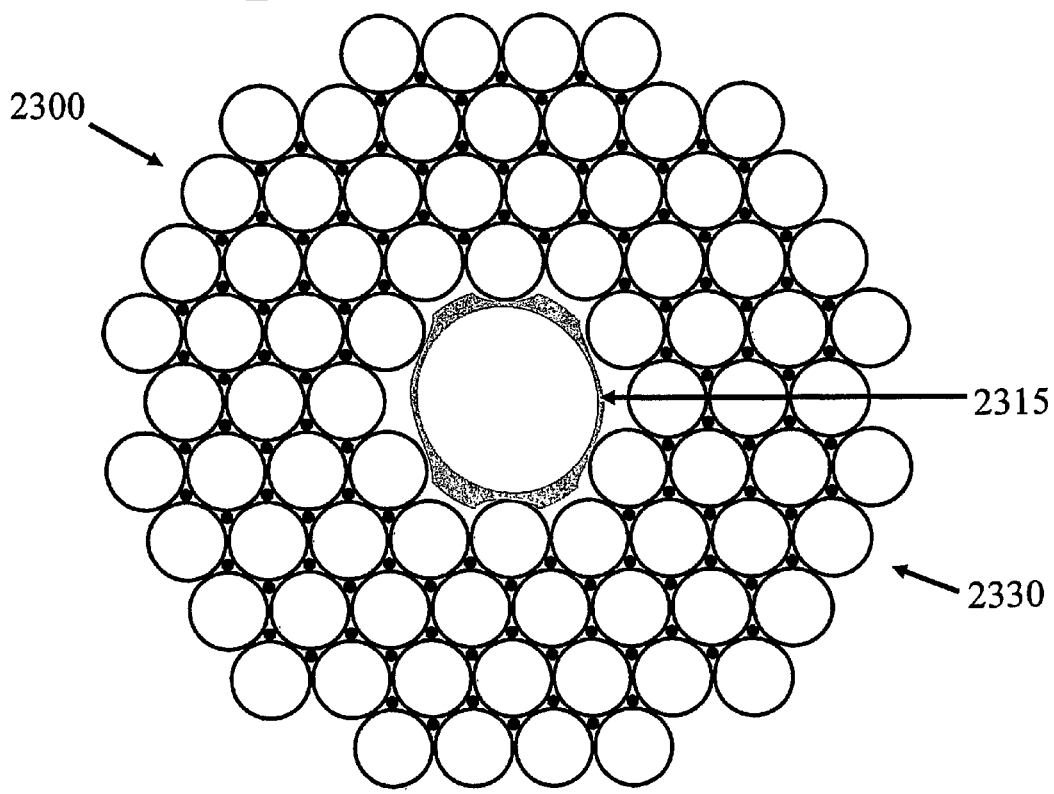

Thicker boundary veins may alternatively be produced by profiling a large diameter capillary 2315, for example by using an etching process. First, as shown in FIG. 23*a*, a masking agent 2310 is applied to a large diameter capillary 2315 in positions which correspond to required regions of increased thickness in a final fibre structure. The masking agent 2310 is one which inhibits etching by HF, for example a polymer-based photo-resist or a noble metal-based material. According to FIG. 23*b*, the capillary is subjected to a flow of HF in an MCVD lathe (not shown), whereby the unmasked capillary surfaces 2320 are etched away to the degree required. Finally, the mask is removed and, as shown in FIG. 23*c*, the capillary 2315 is used in a capillary stack 2300, in which the thicker regions of the capillary 2315 are aligned with the regions of the stack where thicker boundary veins are required. Of course, masking and etching may selectively be applied to inner and/or outer surfaces and regions of the capillary depending of the required final form of the capillary.

Alternatively, a birefringent core boundary may comprise a predominantly thick-walled core boundary (not shown) around which relatively short regions of material have been etched away to render the boundary two-fold rotationally-symmetric. This is in contrast to the thin-walled boundary with a number of relatively short thicker regions, which is described above with reference to FIG. 8. A similar, predominantly thick-walled core boundary may be made in a different manner by heating and 'pinching' regions of a large diameter capillary prior to it being inserted into a capillary stack. Pinched regions of the capillary would form relatively short, thinner regions in a final core boundary, and addition of several appropriately-placed pinches may be used to fine-tune the resulting birefringence of a fibre structure. The capillary could be pinched between two elongate tungsten blades, one on the inside of the capillary and the other aligned with the first on the outside, for example, while the capillary is hot enough to be deformed.

Figure 24:
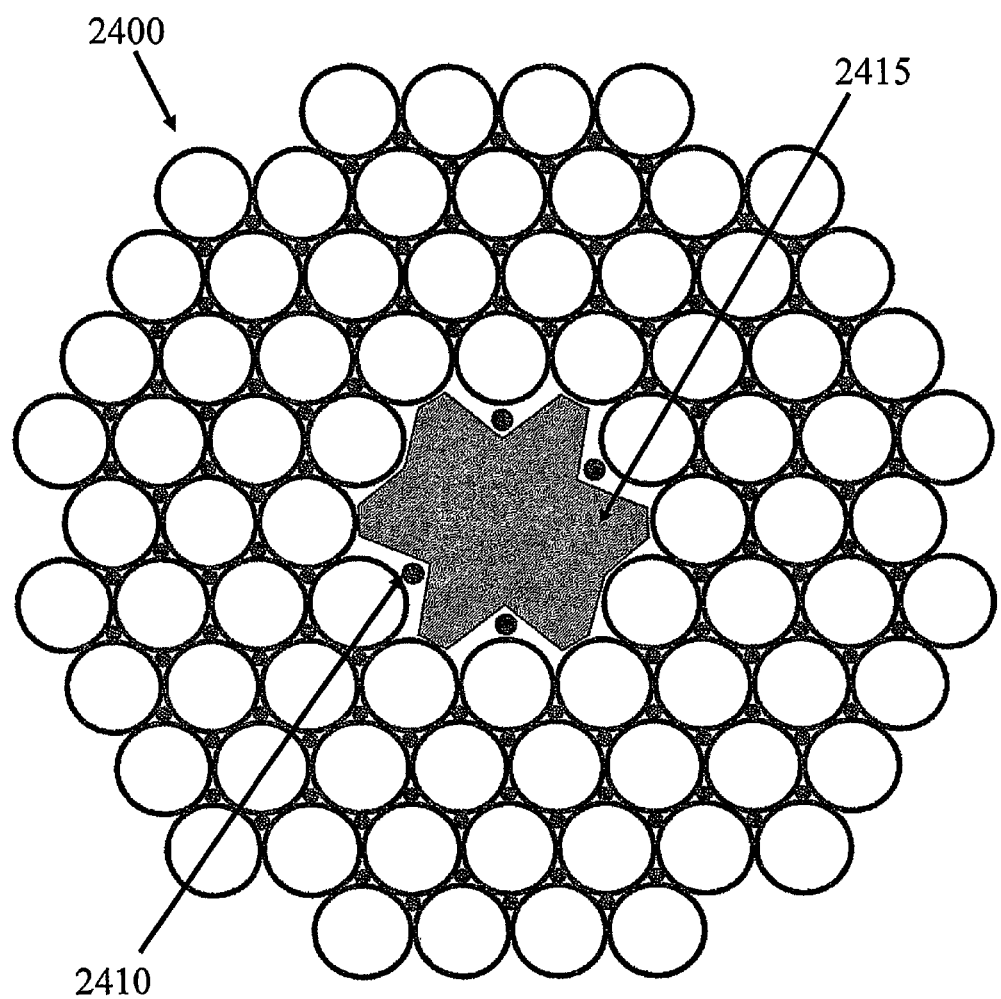

An alternative method for forming a capillary stack 2400, which does not require a large diameter capillary, is illustrated in FIG. 24. A large diameter capillary is omitted and an insert 2415 is used instead; for example made of graphite, platinum, tungsten or a ceramic material, which has a higher melting point than silica glass and, preferably, a higher coefficient of thermal expansion.

The insert 2415 is shaped to support cladding capillaries and rods and also to support additional glass rods 2410, which eventually become pronounced beads 150.

The stack 2400, including the insert 2415, is heated to allow the capillaries and rods to fuse into a preform. The preform is then allowed to cool and the insert 2115 is removed. It will be apparent that, at this point, the inwardly-facing walls of the innermost capillaries take on the general shape of the insert 2415. An advantage of using an insert material having a higher coefficient of thermal expansion than silica is that, when the preform and insert are heated, the insert expands and, relatively-speaking, increases the area of the central region in which the insert is located. When permitted to cool down again, the insert shrinks back down to its original size and the silica solidifies before shrinking fully back down, leaving an inner region that is larger than the insert. The insert 2415, which, as a result, is loose-fitting in the central region, may then be removed readily from the preform with reduced risk of damaging or contaminating the preform 2400. The resulting preform is then heated and drawn in the usual way, in one or more drawing steps.

A further alternative way to form the fibre is by using the process described in PCT/GB00/01249, wherein the cladding capillaries and rods are supported by truncated capillaries at either end of the stack. The stack may be drawn to an optical fibre in the normal way, and the parts of the fibre incorporating the truncated capillary material may be discarded. In principle, truncated capillaries may also be used to support the stack part way along its length.

Figure 25:
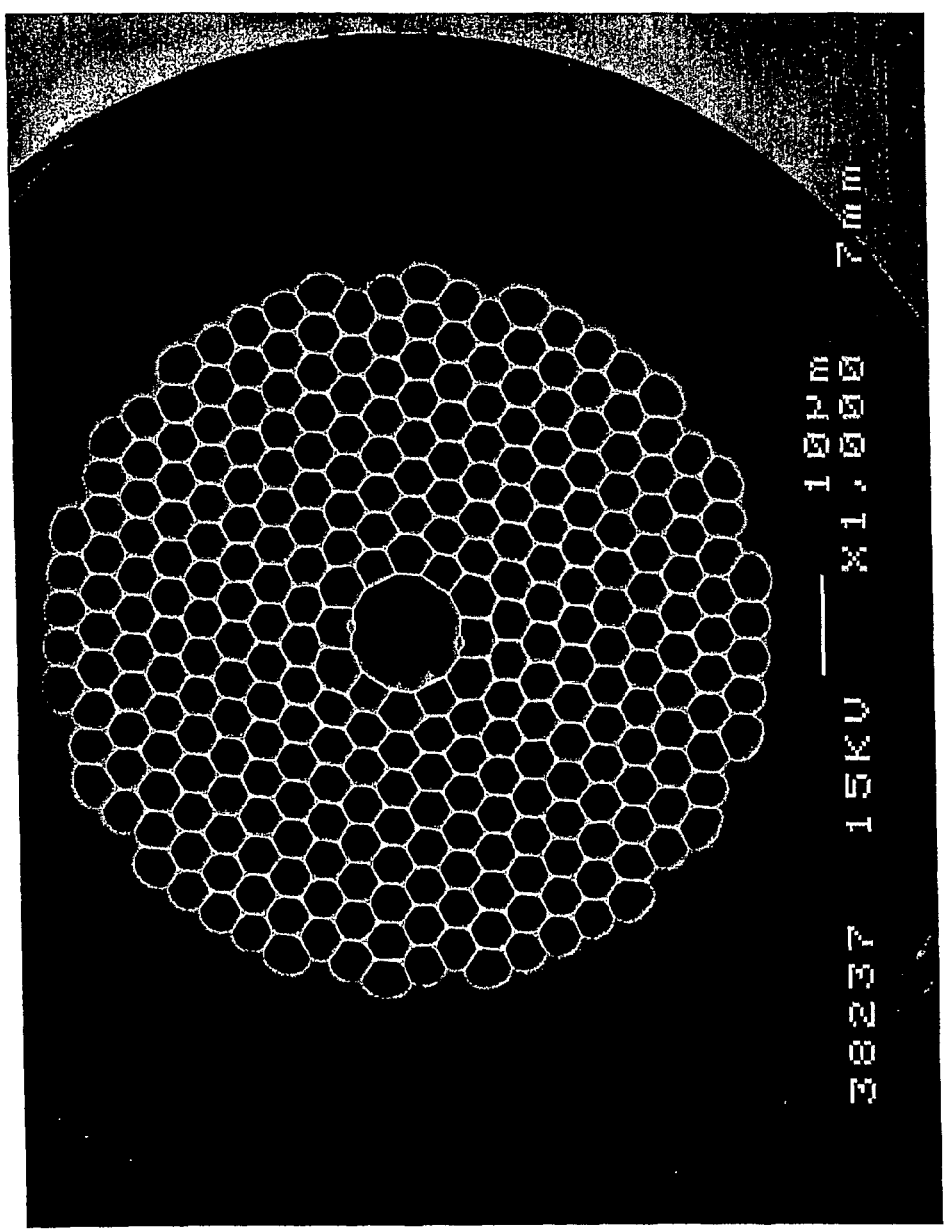
FIG. 25 is an image of a fibre according to an embodiment of the present invention.

FIG. 25 is an image of a fibre made by the present inventors according to an embodiment of the present invention. The fibre structure generally resembles structure S3, which is illustrated in FIG. 7, and comprises a fused silica matrix defining the fibre's structure. The fibre has a core region, which comprises a void, and a first ring of holes forming a core boundary region around the core region. The core boundary region includes an inner, unbroken silica boundary enclosing the core region. The boundary includes two beads on opposite sides of the core region. Seven complete rings of holes form a microstructured cladding region that surrounds the core boundary region. Finally, a solid jacket layer of fused silica surrounds the microstructured cladding region.

The fibre shown in FIG. 25 was found to exhibit a beat length of approximately 7.5 mm at a wavelength of 1550 nm. This clearly indicates that the fibre exhibits birefringence. While this is not a particularly short beat length, it is observed that the core region is slightly elliptically distorted, meaning it is no longer six-fold symmetric, with the beads being generally located on the minor axis. The present inventors have identified that the apparent 10% ellipticity of the core region has partly counteracted the birefringence induced by the presence of the beads. In other words, the fast polarisation axis induced by the beads is orthogonal to the fast polarisation axis induced by the elliptical core region, and the opposing effects have reduced the resulting birefringence of this fibre. In practice, it is expected that either a fibre with a circular core region, or a fibre having beads located on the major axis of an elliptically deformed core region, would produce a significantly shorter beat length and, thus, a strong birefringence in this kind of fibre.

Figure 26:
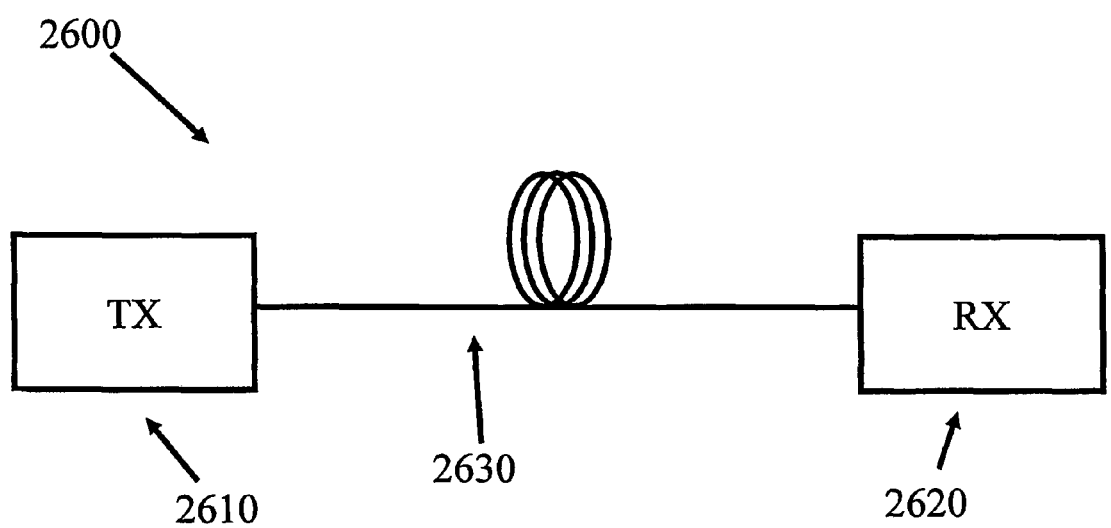
FIG. 26 is a diagram of an exemplary optical fibre transmission system, which incorporates an optical fibre according to an embodiment of the present invention.

FIG. 26 is a diagram of a transmission system 2600 comprising an optical transmitter 2610, an optical receiver 2620 and an optical fibre 2630 between the transmitter and receiver. The optical fibre 2630 comprises along at least a part of its length an optical fibre according to an embodiment of the present invention. Other components or systems, for example to compensate for dispersion and loss, would typically be included in the system but are not shown in FIG. 26 for the sake of convenience only.

The skilled person will appreciate that the various structures described above may be manufactured using the described manufacturing process or a prior art processes, which is adapted to modify the core boundary. For example, rather than using a stacking and drawing approach to manufacture, a pre-form may be made using a known extrusion process and then that pre-form may be drawn into an optical fibre in the normal way.

In addition, the skilled person will appreciate that while the examples provided above relate generally to air-core-guiding PBG fibre structures, comprising triangular cladding arrays, the present invention is in no way limited to such structures. For example, the invention could relate equally to square lattice structures, structures that are not close-packed, or structures with coaxial claddings. Indeed, the structures need not guide light by band-gap guidance. In general, the inventors propose that given a core region that supports guided modes, the form of the boundary at the interface between the core region and the cladding structure will have a significant impact on the characteristics of the waveguide, as described herein.

The skilled person will also appreciate that the structures described herein fit on a continuum comprising a huge number of different structures, for example having different combinations of core defect size, boundary node size, boundary vein thickness and, in general, boundary and cladding form. Clearly, it would be impractical to illustrate each and every variant of waveguide structure herein. As such, the skilled person will accept that the present invention is limited in scope only by the present claims.

The invention claimed is:

1. An elongate waveguide for guiding light, comprising:
    a core region, comprising an elongate region of relatively low refractive index; and
    a cladding region, comprising elongate regions of relatively low refractive index interspersed with elongate regions of relatively high refractive index, including, in a transverse cross-section of the waveguide, a relatively high refractive index boundary region that surrounds the core region, wherein the boundary region comprises a plurality of relatively high refractive index boundary veins joined end-to-end around the core region at boundary nodes, each boundary node being joined between two boundary veins and to at least one relatively high refractive index region of the cladding region, wherein the boundary region has at most two-fold rotational symmetry at least in part due to one or more boundary veins having different properties than other boundary veins or at least in part due to one or more boundary nodes having different properties than other boundary nodes.

2. A waveguide according to claim 1, wherein the boundary region has at most two-fold rotational symmetry at least in part due to azimuthal variations in a property of the boundary region.

3. A waveguide according to claim 1, wherein the boundary region has at most two-fold rotational symmetry at least in part due to azimuthal variations in its thickness, shape, refractive index or other material properties.

4. A waveguide according to claim 1, wherein the boundary region has at most two-fold rotational symmetry at least in part due to one or more boundary veins having different properties than other boundary veins.

5. A waveguide according to claim 1, wherein the boundary region has at most two-fold rotational symmetry at least in part due to one or more boundary veins having a different thickness, shape, length, refractive index or other material property than other boundary veins.

6. A waveguide according to claim 1, wherein the boundary region has at most two-fold rotational symmetry at least in part due to one or more boundary nodes having different properties than other boundary nodes.

7. A waveguide according to claim 1, wherein the boundary region has at most two-fold rotational symmetry at least in part due to one or more boundary nodes having a different size, shape, refractive index or other material property than other boundary nodes.

8. A waveguide according to claim 1, wherein the boundary region comprises an inner periphery and an outer periphery, which has a substantially different form than the inner periphery.

9. A waveguide according to claim 8, wherein the combination of the forms of the inner periphery and the outer periphery result in the boundary region having at most two-fold rotational symmetry.

10. A waveguide according to claim 1, wherein the boundary region comprises a plurality of boundary cells around the core region.

11. A waveguide according to claim 10, wherein the boundary region has at most two-fold rotational symmetry at least in part due to differences in one or more of the characteristics of the boundary cells.

12. A waveguide according to claim 10, wherein the boundary cells together do not tile onto any arrangement of cells in the cladding region.

13. A waveguide according to claim 1, wherein, the cladding region comprises an array of relatively low refractive index regions in a matrix of relatively high refractive index regions.

14. A waveguide according to claim 13, wherein, the array, apart from the boundary region, is substantially periodic.

15. A waveguide according to claim 1, wherein, the cladding region, apart from the boundary region, has a highest rotational symmetry that is less than or equal to two.

16. A waveguide according to claim 1, wherein, the cladding region, apart from the boundary region, has a rotational symmetry that is greater than two.

17. A waveguide according to claim 1, wherein, the core region, apart from the boundary region, has a highest rotational symmetry that is less than or equal to two.

18. A waveguide according to claim 1, wherein, the core region, apart from the boundary region, has a rotational symmetry that is greater than two.

19. A waveguide according to claim 1, wherein the core region includes a hole.

20. A waveguide according to claim 19, wherein the hole is filled with a material other than air.

21. A waveguide according to claim 1, wherein the core region does not include a hole.

22. A waveguide according to claim 1, wherein at least some of the relatively high refractive index regions comprise fused glass.

23. A waveguide according to claim 1, wherein at least some of the elongate regions of relatively low refractive index in the cladding region comprise an air hole.

24. A waveguide according to claim 1, having a beat length, which is less than 10 mm at a given wavelength.

25. A waveguide according to claim 24, in which the given wavelength is in the region of 1550 nm, 1310 nm, 1060 nm or 800 nm.

26. A waveguide according to claim 1, wherein, in use, the two polarization states of a spatial mode of the waveguide exhibit significantly different field decays at a given radial distance from the centre of the waveguide.

27. A waveguide according to claim 1, wherein the amount by volume of relatively lower refractive index material in the cladding region exceeds 50%.

28. An optical fibre comprising a waveguide according to claim 1.

29. An optical transmission system incorporating an optical fibre according to claim 28.

30. A method of forming the optical fibre according to claim 28, wherein the optical fibre is a photonic crystal fibre, comprising:

forming a preform comprising an elongate, relatively low refractive index core region, and, surrounding the core region, an elongate cladding region, comprising elongate regions of relatively low refractive index interspersed with elongate regions of relatively high refractive index;

forming, at the interface between the core region and the cladding region, a boundary region, comprising one or more relatively high refractive index regions, which has at most two-fold rotational symmetry due to azimuthal variations, which are uncharacteristic of the cladding region; and drawing the pre-form into a fibre, which has no more than two-fold rotational symmetry about any longitudinal axis.

31. A method according to claim 30, including forming the pre-form from a plurality of elongate members, at least some of which are capillaries.

32. A method according to claim 30, including forming the pre-form by extrusion.

33. A method of forming the optical fibre according to claim 28, wherein the optical fibre is a birefringent photonic crystal fibre, comprising:

arranging a plurality of elongate members, at least some of which are capillaries, into a pre-form stack comprising an elongate cladding region enclosing an elongate core region, the members in the cladding region forming a characteristic pattern, apart from at least one member in a boundary region, at or near to the core region, which breaks the characteristic pattern and renders the boundary region, in the transverse cross-section, no more than two-fold rotationally symmetric about any axis; and drawing the pre-form stack into a fibre, which has no more than two-fold rotational symmetry about any longitudinal axis.

34. A waveguide according to claim 1, wherein the boundary region defines the cross-sectional shape of the core region.

35. A waveguide according to claim 1, wherein the boundary region is arranged at the interface between the core region and the cladding region.

36. A waveguide according to claim 33, wherein the boundary region is arranged at the interface between the core region and the cladding region.

37. The waveguide according to claim 1, wherein the elongate region of relatively low refractive index in the core region comprises an air hole.

* * * * *